US009810917B2

(12) United States Patent
Hubert et al.

(10) Patent No.: US 9,810,917 B2
(45) Date of Patent: Nov. 7, 2017

(54) PASSIVE DAMPING FOR OPTICAL IMAGE STABILIZATION

(71) Applicant: Apple Inc., Cupertino, CA (US)

(72) Inventors: Aurelien R. Hubert, Saratoga, CA (US); Douglas S. Brodie, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 21 days.

(21) Appl. No.: 14/294,104

(22) Filed: Jun. 2, 2014

(65) Prior Publication Data

US 2015/0212336 A1  Jul. 30, 2015

Related U.S. Application Data

(60) Provisional application No. 61/931,490, filed on Jan. 24, 2014.

(51) Int. Cl.
| G02B 27/64 | (2006.01) |
| H04N 5/232 | (2006.01) |
| H04N 5/225 | (2006.01) |
| G02B 7/08  | (2006.01) |

(52) U.S. Cl.
CPC ............ *G02B 27/646* (2013.01); *G02B 7/08* (2013.01); *H04N 5/2254* (2013.01); *H04N 5/2257* (2013.01); *H04N 5/23258* (2013.01); *H04N 5/23287* (2013.01); *Y10T 29/49885* (2015.01)

(58) Field of Classification Search
CPC ............ H04N 5/23287; H04N 5/2253; H04N 5/2254; H04N 5/2257; G02B 27/64; G02B 27/646; G02B 13/001–13/009; G03B 5/02; G03B 2205/007; G03B 2205/0015; G03B 2205/0053–2205/0084; H04M 1/0264
See application file for complete search history.

(56) References Cited

U.S. PATENT DOCUMENTS

| 8,456,041 B2 | 6/2013 | Kwon |
| 8,611,735 B2 | 12/2013 | Sekimoto |
| 2009/0127723 A1* | 5/2009 | Zhang ................. G03F 7/70633 257/797 |

(Continued)

OTHER PUBLICATIONS

U.S. Appl. No. 14/292,867, filed May 31, 2014, Richard H. Tsai.

(Continued)

*Primary Examiner* — Paul Berardesca
(74) *Attorney, Agent, or Firm* — Robert C. Kowert; Meyertons, Hood, Kivlin, Kowert & Goetzel, P.C.

(57) ABSTRACT

Passive dampers (e.g., a viscoelastic material such as a silicon gel) may be applied at one or more locations within an actuator module between a moving component (an optics assembly) and a fixed component (e.g., a cover attached to a base). The passive dampers act to passively dampen the motion of the optics assembly on the XY plane within the actuator module during optical image stabilization (OIS) of the optics assembly when subjected to external excitation or disturbance, and may also provide Z (optical) axis damping and impact protection. Process control and automation manufacturing and assembly methods for an OIS voice coil motor (VCM) actuator module including passive dampers are described, as well as design elements that provide for the integrity and reliability of the passive dampers over the life cycle of the actuator module.

20 Claims, 24 Drawing Sheets

(56) References Cited

U.S. PATENT DOCUMENTS

| | | | | |
|---|---|---|---|---|
| 2013/0050515 A1* | 2/2013 | Wu | ............................ | G02B 7/08 |
| | | | | 348/208.5 |
| 2013/0050828 A1* | 2/2013 | Sato | ........................ | G02B 27/64 |
| | | | | 359/557 |
| 2013/0142502 A1 | 6/2013 | Kang et al. | | |
| 2014/0043496 A1 | 2/2014 | Azuma | | |
| 2016/0377881 A1* | 12/2016 | Jung | ........................ | G02B 7/08 |
| | | | | 359/824 |

OTHER PUBLICATIONS

U.S. Appl. No. 14/042,559, filed Sep. 30, 2013, Richard J. Topliss.
U.S. Appl. No. 14/042,036, filed Sep. 30, 2013, Richard L. Baer.
U.S. Appl. No. 14/042,548, filed Sep. 30, 2013, Douglas S. Brodie.
U.S. Appl. No. 14/042,025, filed Sep. 30, 2013, Richard J. Topliss.

* cited by examiner

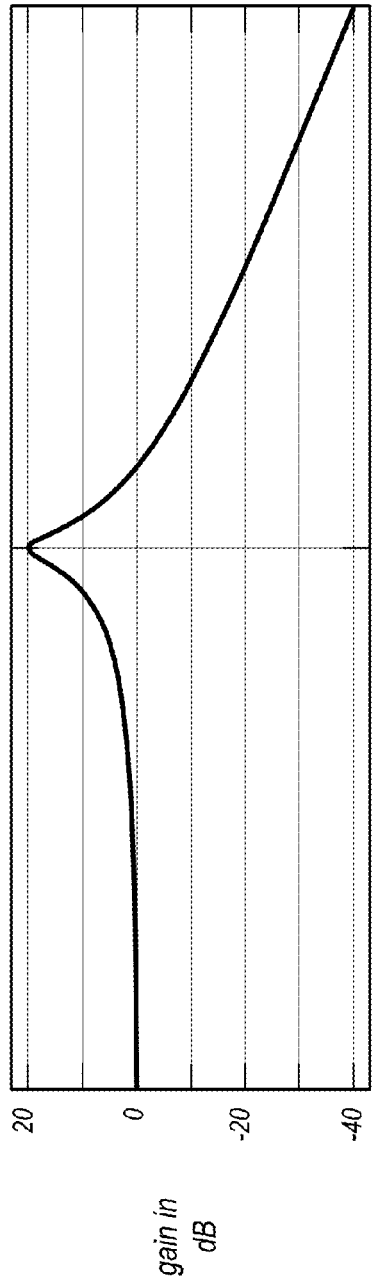
FIG. 2

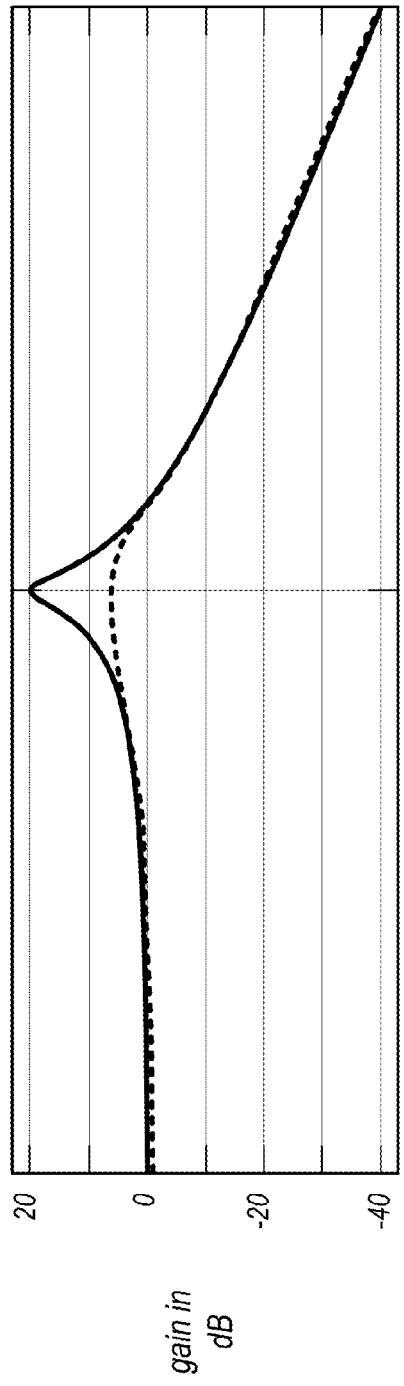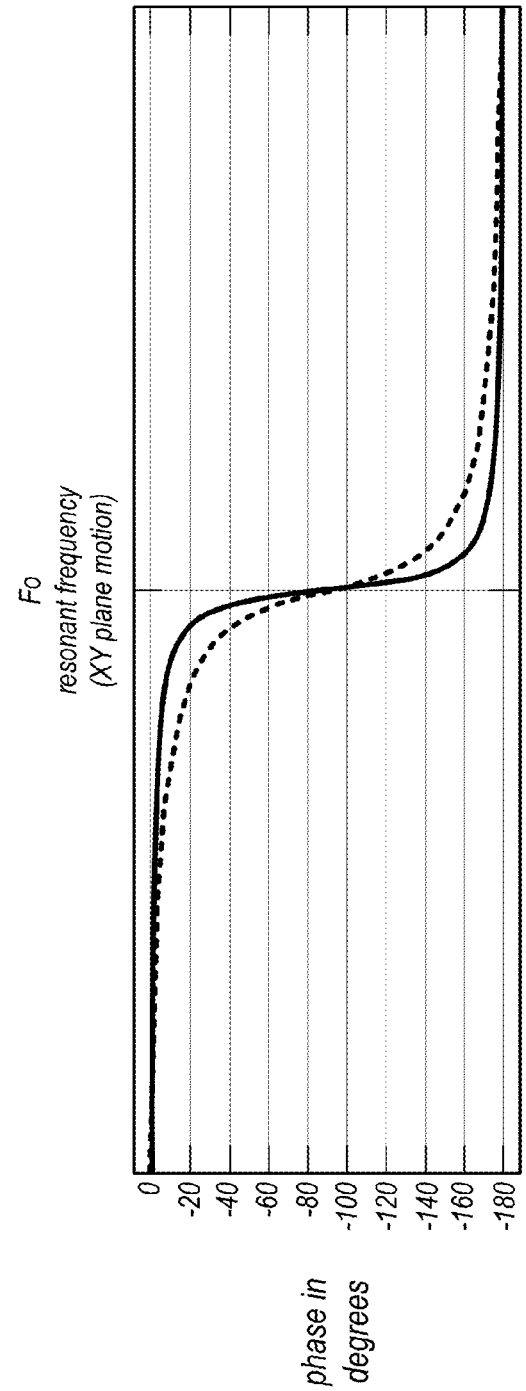
FIG. 3

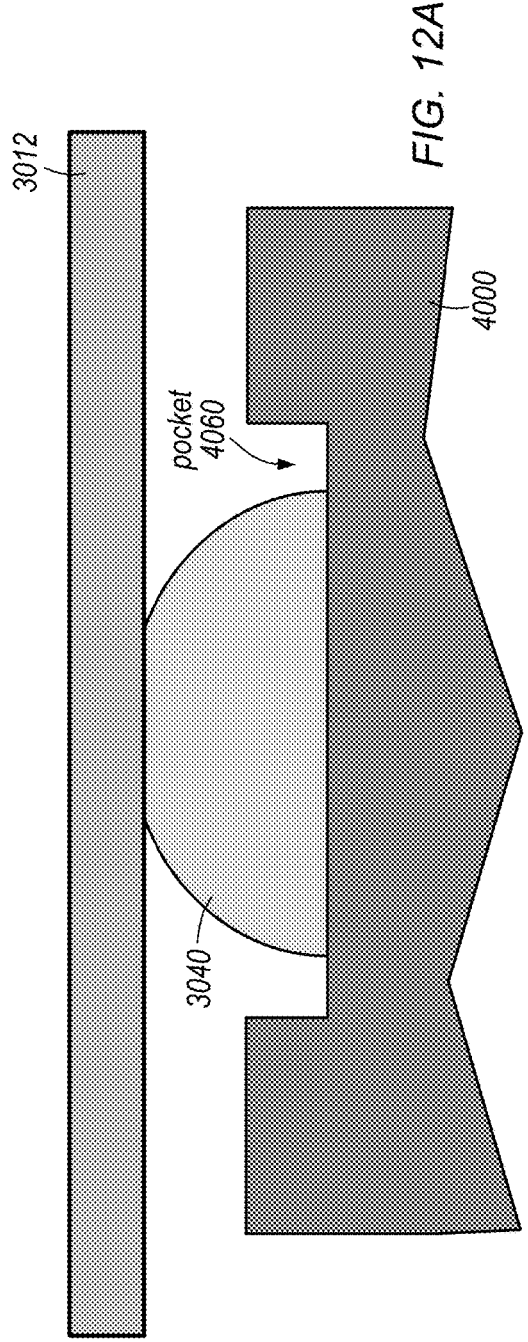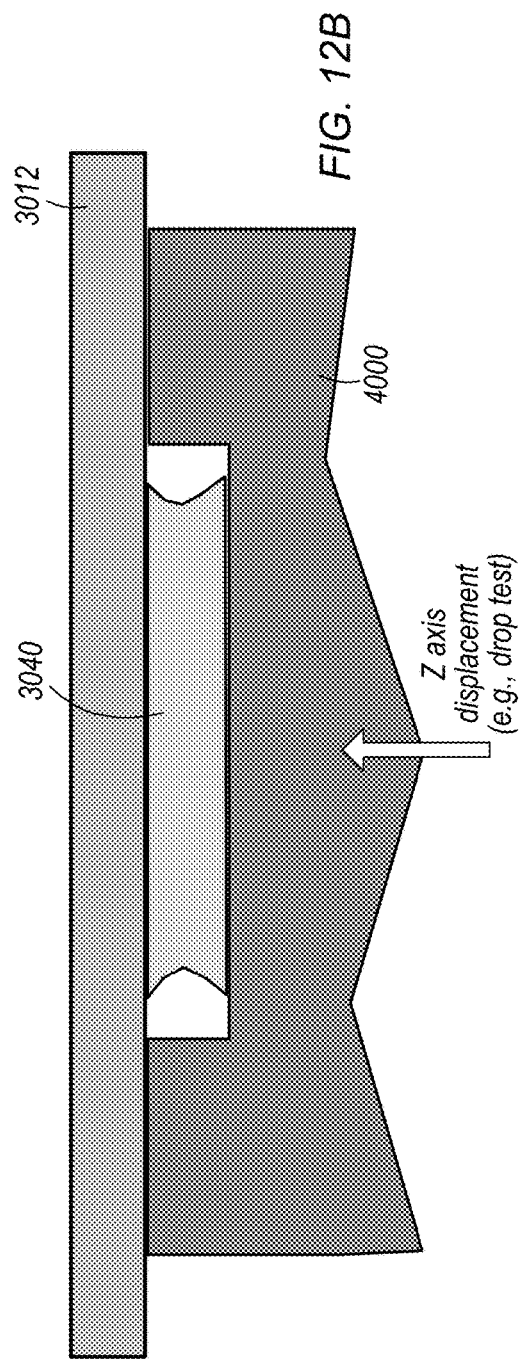

FIG. 13A — base assembly
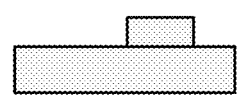
FIG. 13B — optics assembly
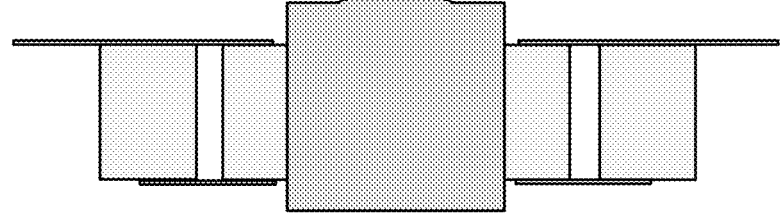
FIG. 13C — suspension wire assembly
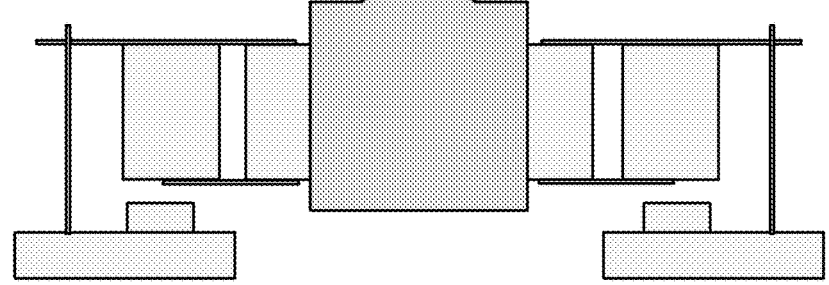
FIG. 13D — damping gel application
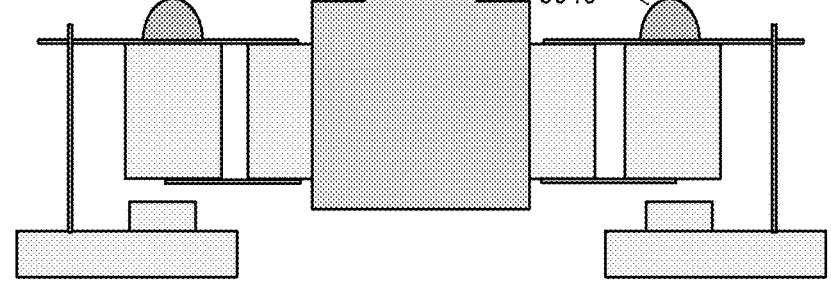
3040
FIG. 13E — cover (e.g., EMI shield can) assembly
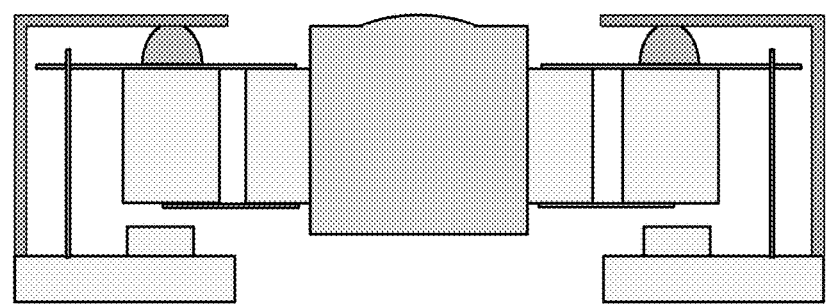

Dispensing (AOI – Automated Optical Inspection)

AOI Vertical Control (To FIG. 14C)

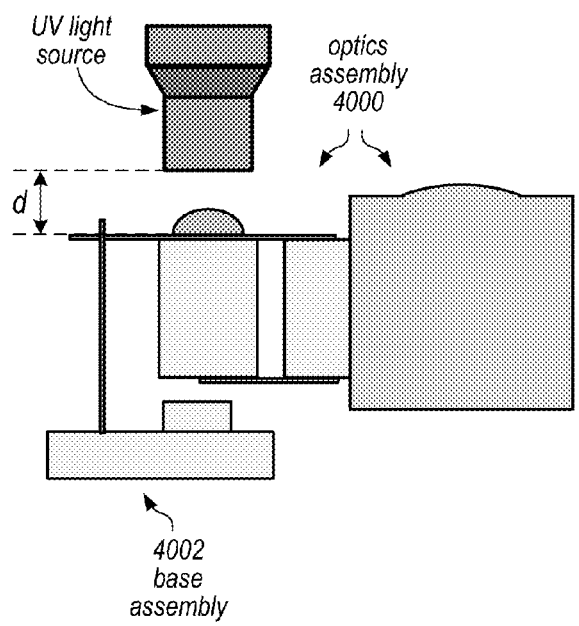
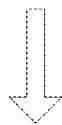
FIG. 14C
UV Light Curing
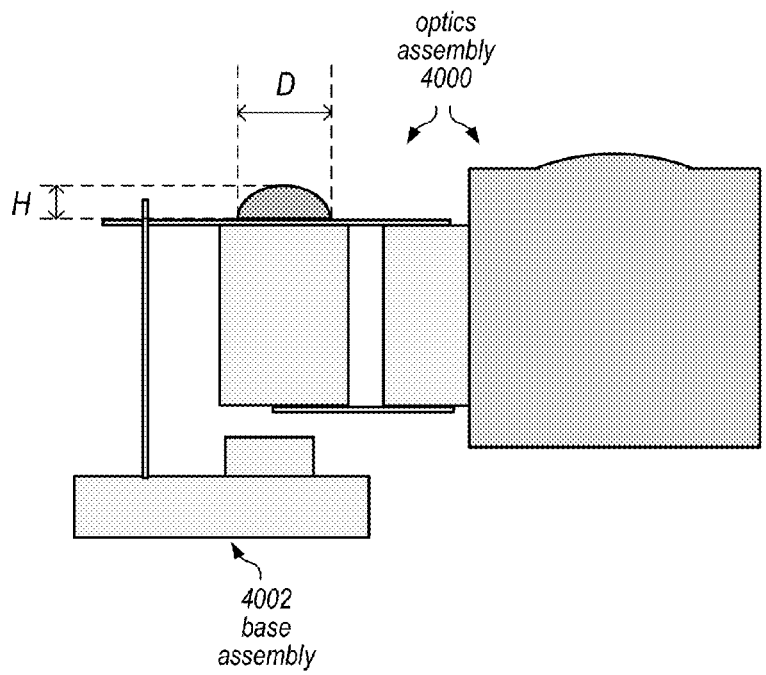
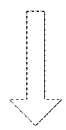
FIG. 14D
AOI Profile Scanner

PASSIVE DAMPING FOR OPTICAL IMAGE STABILIZATION

PRIORITY INFORMATION

This application claims benefit of priority of U.S. Provisional Application Ser. No. 61/931,490 entitled "PASSIVE DAMPING FOR OPTICAL IMAGE STABILIZATION VOICE COIL MOTORS" filed Jan. 24, 2014, the content of which is incorporated by reference herein in its entirety.

BACKGROUND

Technical Field

This disclosure relates generally to control of the motion of camera components.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation or disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane or field in front of the camera at an image plane to be captured by an image sensor (also referred to herein as a photosensor). In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation or disturbance by adjusting location of the optical lens on the X and/or Y axis in an attempt to compensate for unwanted motion of the lens.

SUMMARY OF EMBODIMENTS

An apparatus for controlling motions of an optics component (e.g., a lens or lens system) relative to an image sensor within a camera may include an actuator mechanism for controlling the position of the optics component relative to the image sensor along two axes (X, Y) orthogonal to the optical (Z) axis of the camera. The apparatus may be referred to herein as an actuator module. In some embodiments, an optics assembly that includes the optics component and at least some components of the actuator mechanism may be suspended on a plurality of wires or beams over a base of the actuator module, with the image sensor disposed at or below the base. Each suspension wire may be substantially parallel to the optical axis. In at least some embodiments, the wires are capable of bending deformations that allow the optics assembly to move in linear directions orthogonal to the optical axis (i.e., on the XY plane). The actuator mechanism may provide optical image stabilization (OIS) for the camera, and in some embodiments may be implemented as a voice coil motor (VCM) actuator mechanism. The actuator module may, for example, be used as or in a miniature or small form factor camera suitable for small, mobile multipurpose devices such as cell phones, smartphones, and pad or tablet devices. In at least some embodiments, the actuator module may also include a focusing mechanism for moving the optics component along an optical (Z) axis within the optics assembly.

Embodiments of passive damping techniques for an actuator module that includes an optics assembly are described herein. In embodiments, a passive damping component (e.g., a gel such as a silicon gel, or other material) may be applied at one or more locations within the actuator module. The passive damping components may be referred to herein as passive dampers. In at least some embodiments, the locations where the passive dampers are applied are at the top of a moving component of the actuator module (e.g., the optics assembly), between the moving component and a fixed component of the actuator module (e.g., a cover attached to a base of the actuator module). In some embodiments, the locations where the passive dampers are applied may be between a magnet holder component of the optics assembly and the fixed component, where the magnet holder component is part of the actuator mechanism.

The application of the passive dampers at these locations, physical properties of the passive damping material (e.g., a silicon gel) such as viscoelasticity, and the contact of the passive dampers with a surface of the moving component (e.g., an optics assembly) and with a surface of the fixed component (e.g., a cover fixed to a base) may act to passively dampen motion of the optics assembly on the XY plane within the actuator module during optical image stabilization (OIS) of the optics assembly when subjected to external excitation or disturbance. In some embodiments, the passive dampers may also provide Z axis damping and reduce impact shock on the optics assembly. Further, this location of the passive dampers may be a favorable design for process control and automation during manufacturing and assembly of an OIS VCM actuator module. In addition, at least some embodiments may include design elements that provide for the integrity and reliability of the passive damping material (e.g., damping gel) over the life cycle of the actuator module.

BRIEF DESCRIPTION OF THE DRAWINGS

FIG. 2 illustrates instability of an optical image stabilization (OIS) voice coil motor (VCM) actuator under an external excitation or disturbance that is equal to natural resonant frequency.

FIG. 3 illustrates stabilization of an OIS VCM actuator under an external excitation or disturbance that is equal to natural resonant frequency using passive damping, according to at least some embodiments.

FIGS. 12A and 12B illustrate an embodiment that includes a pocket to contain the passive damping component (e.g., damping gel) during compression as illustrated in FIG. 11, according to at least some embodiments.

FIGS. 13A through 13E graphically illustrate an example manufacturing process for an actuator module that may be used in a small form factor camera, according to at least some embodiments.

FIGS. 14A through 14D graphically illustrate an example method for damping gel application during a manufacturing process for an actuator module, according to at least some embodiments.

Figure 1A:
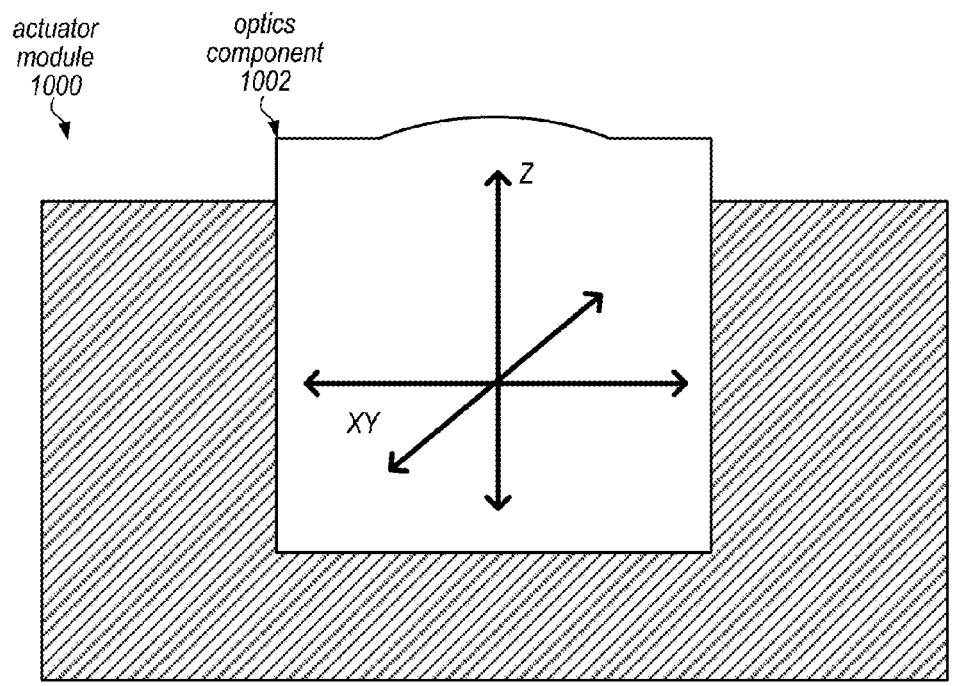
FIGS. 1A and 1B illustrate motion of an optics component within an actuator module, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An apparatus for controlling motions of an optics component relative to an image sensor within a camera may include an actuator mechanism for controlling the position of the optics component relative to the image sensor along two axes (X, Y) orthogonal to the optical (Z) axis of the camera. The apparatus may be referred to herein as an actuator module. In some embodiments, an optics assembly that includes the optics component and that may also include at least some components of the actuator mechanism (e.g., magnets and/or coils) may be suspended on a plurality of wires or beams over a base of the actuator module, with the image sensor disposed at or below the base. Each suspension wire may be substantially parallel to the optical axis. In at least some embodiments, the wires are capable of bending deformations that allow the optics assembly to move in linear directions orthogonal to the optical axis (i.e., on the XY plane). The actuator mechanism may provide optical image stabilization (OIS) for the camera, and in some embodiments may be implemented as a voice coil motor (VCM) actuator mechanism. The actuator module may, for example, be used as or in a miniature or small form factor camera suitable for small, mobile multipurpose devices such as cell phones, smartphones, and pad or tablet devices. In at least some embodiments, the actuator module may also include a focusing mechanism for moving the optics component along an optical (Z) axis within the optics assembly.

In embodiments of passive damping techniques for an actuator module that includes an optics assembly as described herein, a passive damping component (e.g., a gel such as a silicon gel, or other material) may be applied at one or more locations within the actuator module. The passive damping components may be referred to herein as passive dampers.

In at least some embodiments, the locations where the passive dampers are applied within the actuator module are at the top of a moving component of the actuator module (e.g., the optics assembly), between the moving component and a fixed component of the actuator module (e.g., a cover attached to a base of the actuator module). In some embodiments, the locations where the passive dampers are applied may be between a magnet holder component of the optics assembly and the fixed component, where the magnet holder component is part of the actuator mechanism. However, it is to be noted that passive dampers as described herein may be applied at one or more other locations within an actuator module as described herein instead of or in addition to locations at the top of the moving assembly. For example, in some embodiments, instead of or in addition to locating passive dampers at the top of the moving assembly between the moving assembly and the fixed component (e.g., a cover attached to a base of the actuator module), passive dampers may be located at the bottom of the moving assembly between the moving assembly and the fixed component (e.g., the base of the actuator module).

The application of the passive dampers at these locations, physical properties of the passive damping material (e.g., a silicon gel) such as viscoelasticity, and the contact of the passive dampers with a surface of the moving component (e.g., an optics assembly) and with a surface of the fixed component (cover) act to passively dampen motion of the optics assembly on the XY plane within the actuator module during optical image stabilization (OIS) of the optics assembly when subjected to external excitation or disturbance.

Figure 11:
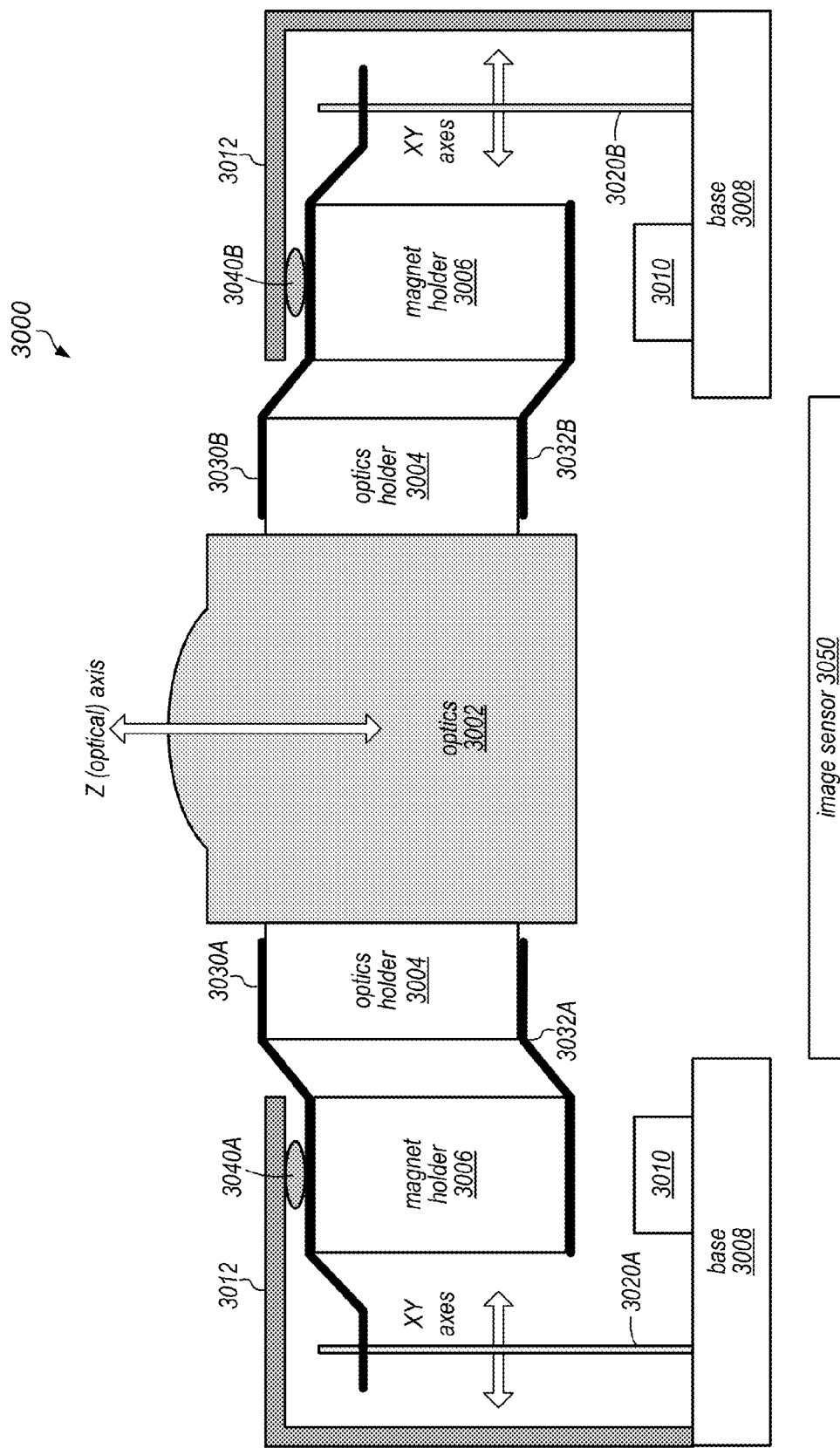
FIG. 11 illustrates compression of the passive damping components during a drop test, according to at least some embodiments.

In some embodiments, in addition to damping motion on the XY plane, the passive dampers (e.g., damping gel) located on top of the moving component (e.g., an optics assembly) and disposed between the moving component and the fixed component may also act as a damper or "shock absorber" for a drop test event (Z axis damping), for example as illustrated in FIGS. 11, 12A, and 12B. This may improve drop test reliability, damping acceleration and reducing impact shock of the suspended mechanism (the optics assembly) within the actuator module.

Further, the location of the passive dampers on top of the moving component (e.g., an optics assembly) and between the moving component and a fixed component (a cover) may be a favorable location for process control and automation during manufacturing and assembly of an actuator module. In addition, at least some embodiments may include design elements that provide for the integrity and reliability of the passive damping material (e.g., damping gel) over the life cycle of the actuator module.

Passive Damping for Optical Image Stabilization

Figure 1B:
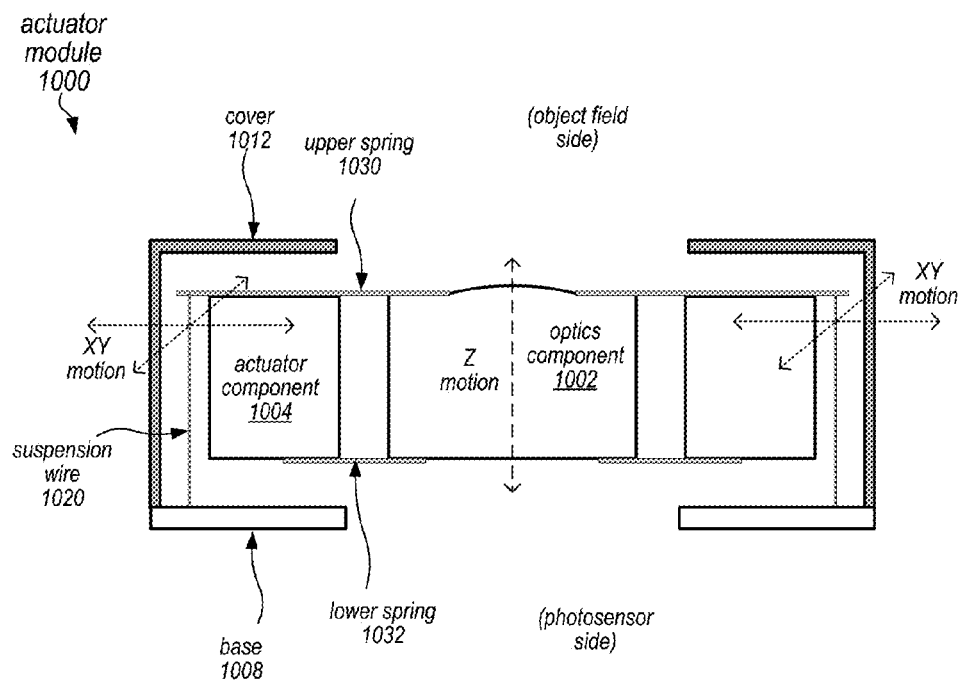

FIGS. 1A and 1B illustrate motion of an optics component 1002 within an actuator module 1000, according to at least some embodiments. As shown in FIG. 1A, an actuator module 1000 may provide optical image stabilization (OIS) for the optics component 1002. In at least some embodiments, the actuator module 1000 may implement a voice coil motor (VCM) actuator mechanism. An actuator module 1000 such as an OIS VCM actuator module may provide motion to optics component 1002 in the XY plane. In addition, in some embodiments, motion may also be provided to optics component 1002 on the Z (optical) axis, for example by a focusing mechanism of the actuator module 1000 for moving the optics component 1002 along the optical (Z) axis within the actuator module 1000. The XY plane motion is, for example, for optical image stabilization (OIS) relative to a photosensor in a camera. The Z axis motion may, for example, be for optical focusing or autofocus purposes in cameras that incorporate focusing/autofocus mechanisms. Example embodiments of an optical image stabilization (OIS) voice coil motor (VCM) actuator are illustrated as actuator module 3000 in FIGS. 4, 5A-5B, 6, and 7. Details of example embodiments, implementations, and methods of operations of OIS VCM actuators such as the example actuator module 3000 shown in these Figures are provided in FIGS. 17 through 26 and in the section titled Example actuator modules. Embodiments of the actuator module 3000 may, for example, be used in a miniature or small form factor camera suitable for small, mobile multipurpose devices such as cell phones, smartphones, and pad or tablet devices. Example, non-limiting embodiments of devices that may incorporate these small form factor cameras are given in FIGS. 27 and 28.

FIG. 1B illustrates components of an example actuator module 1000 that provides X, Y and Z motions for an optics component 1002, according to at least some embodiments. In some embodiments, an optics assembly of the actuator module 1000 may include an optics component 1002 that is coupled to an actuator component 1004 by upper and/or lower springs 1030 and 1032. Note that the object field side of the optics component 1002 may be referred to as the top or upper side or surface of the actuator module 1000 and optics assembly, while the photosensor side of the optics component 1002 may be referred to as the bottom or lower side or surface of the actuator module 1000 and optics assembly. The actuator component 1004 may, for example, include magnets used in a voice coil motor (VCM) actuator mechanism. The springs 1030 and 1032 may be flexible to allow motion of the optics component 1002 on the Z axis relative to the actuator component 1004. The actuator mechanism may be configured to move the optics component 1002 on the Z axis within the actuator module 1000 to provide focusing or autofocus for the camera. The optics assembly, which includes at least optics component 1002, actuator component 1004, and springs 1030 and 1032, may be suspended within the actuator module 1000 on two or more suspension wires 1020. For example, the suspension wires 1020 may be mounted to base 1008, and the optics assembly may be suspended on the wires 1020 at the outer portion of the upper springs 1030. The suspension wires 1020 may be flexible to allow motion of the optics assembly, and thus of the optics component 1002, on the XY axes orthogonal to the Z (optical) axis of the optics component 1002. The actuator component 1004 may be configured to move the optics assembly and thus the optics component 1002 on the XY axes within the actuator module 1000 to provide optical image stabilization (OIS) for the camera.

A challenge with optical image stabilization (OIS) within an actuator module 1000 of a camera is the capacity to control the optics component 1002 and to displace the optics component 1002 accurately back to the optical center relative to the XY plane when subject to external excitation or disturbance. FIG. 2 illustrates instability of an OIS voice coil motor (VCM) actuator under an external excitation or disturbance that is equal to a natural resonant frequency. In at least some embodiments, an OIS VCM actuator mechanism has, by design, specific natural resonant frequency modes noted as $F_0$, $F_1$, ... $F_n$. Factors including one or more of structure, material, geometry, assembly, mass, and so on may affect these natural resonant frequency modes. FIG. 2 shows a spike at natural resonant frequency mode $F_0$. In XY excitation, the first order of natural resonant frequency $F_0$ for an OIS VCM actuator mechanism is typically low, for instance around 60 Hz.

In terms of controlling the actuator mechanism, it may be difficult to stabilize the optics under an external excitation or disturbance that is equal to a natural resonant frequency of the actuator mechanism, which may limit the performance of the control system for the actuator mechanism. If the system falls into one of these frequencies under an external excitation, the moving component of the actuator module may exhibit higher amplitude of movement, shown as the gain in FIG. 2. As a result, the system may become unstable. When the system becomes unstable, image quality is adversely affected.

In order to improve the stability of systems including but not limited to OIS VCM actuator systems, a solution is to use one or more passive damping techniques. FIG. 3 illustrates stabilization of an OIS VCM actuator under an external excitation or disturbance that is equal to a natural resonant frequency using a passive damping technique, according to at least some embodiments. The dashed line shows how a passive damping technique may smooth the spike at natural resonant frequency mode $F_0$.

An example passive damping technique involves the application of a non-rigid, viscous and/or elastic (or viscoelastic) substance or material at one or more locations within a system, an example of which is a silicon gel that may be applied at location(s) within the system and activated by the application of UV light. Silicon damping gels have been applied in various systems for improving stability and increasing control performance. However, note that other gels, substances, materials, and/or mechanisms may be used in various passive damping techniques.

Figure 4:
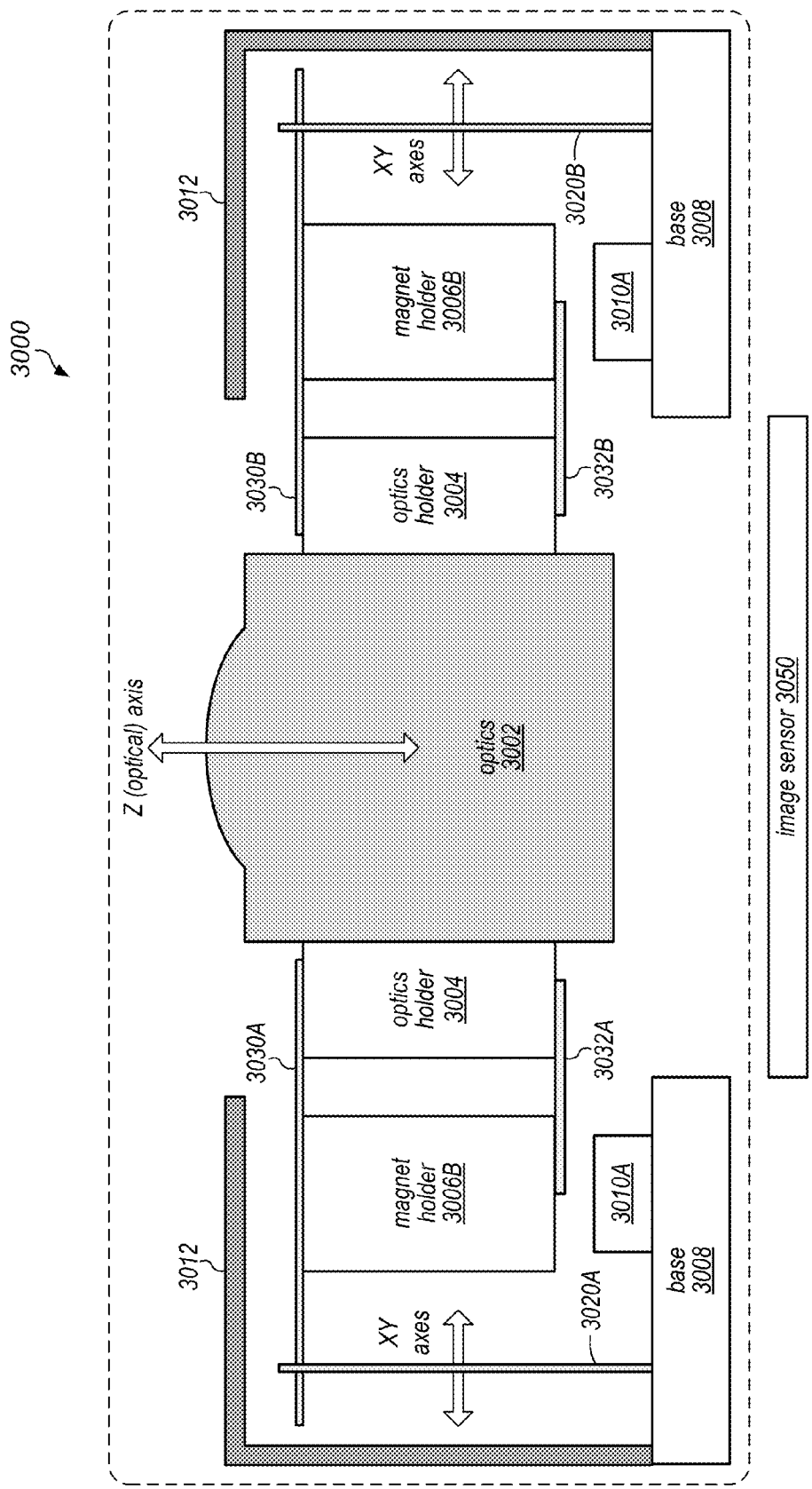
FIG. 4 shows a side view of an example embodiment of an actuator module that may, for example, be used in small form factor cameras, according to at least some embodiments.
Figure 5A:
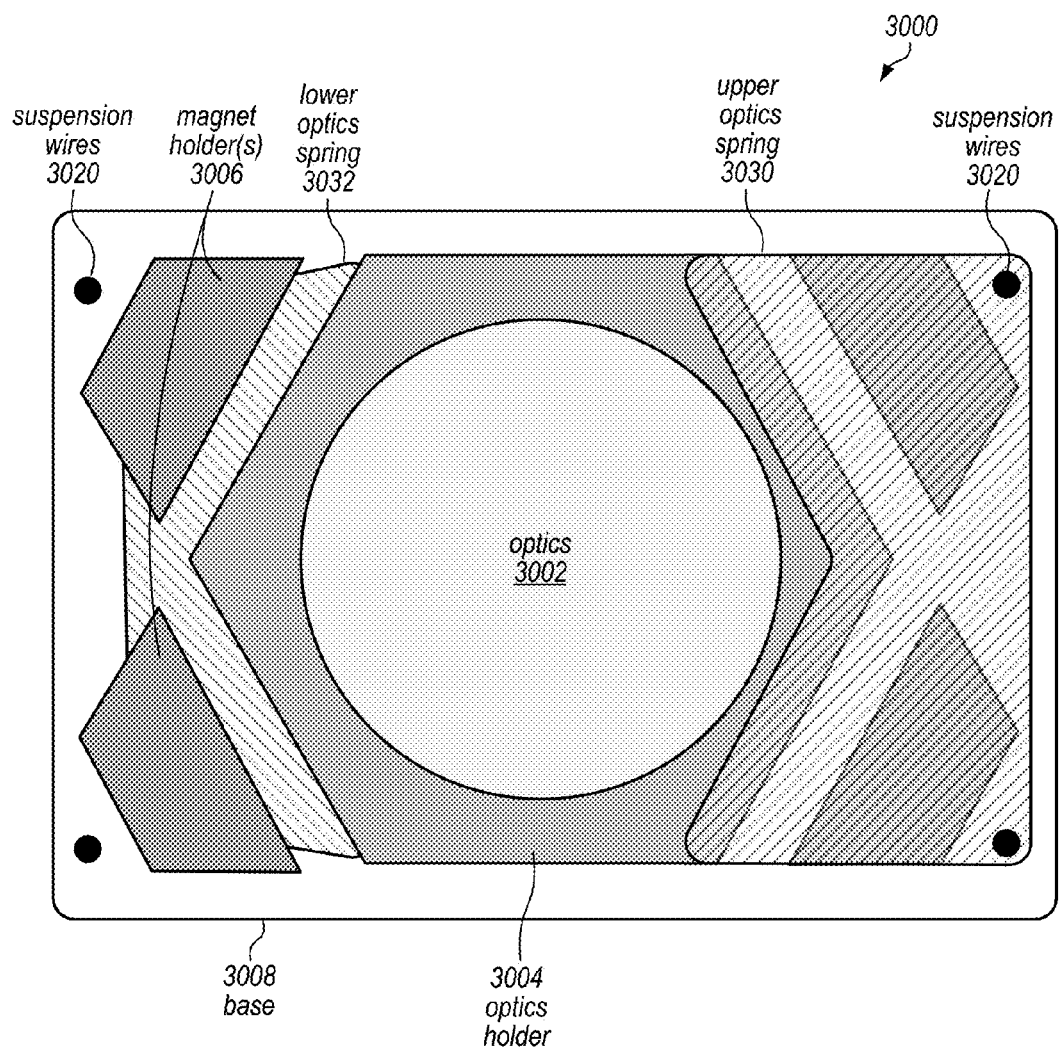
FIG. 5A shows a top view of the actuator module of FIG. 4 with the cover removed.
Figure 5B:
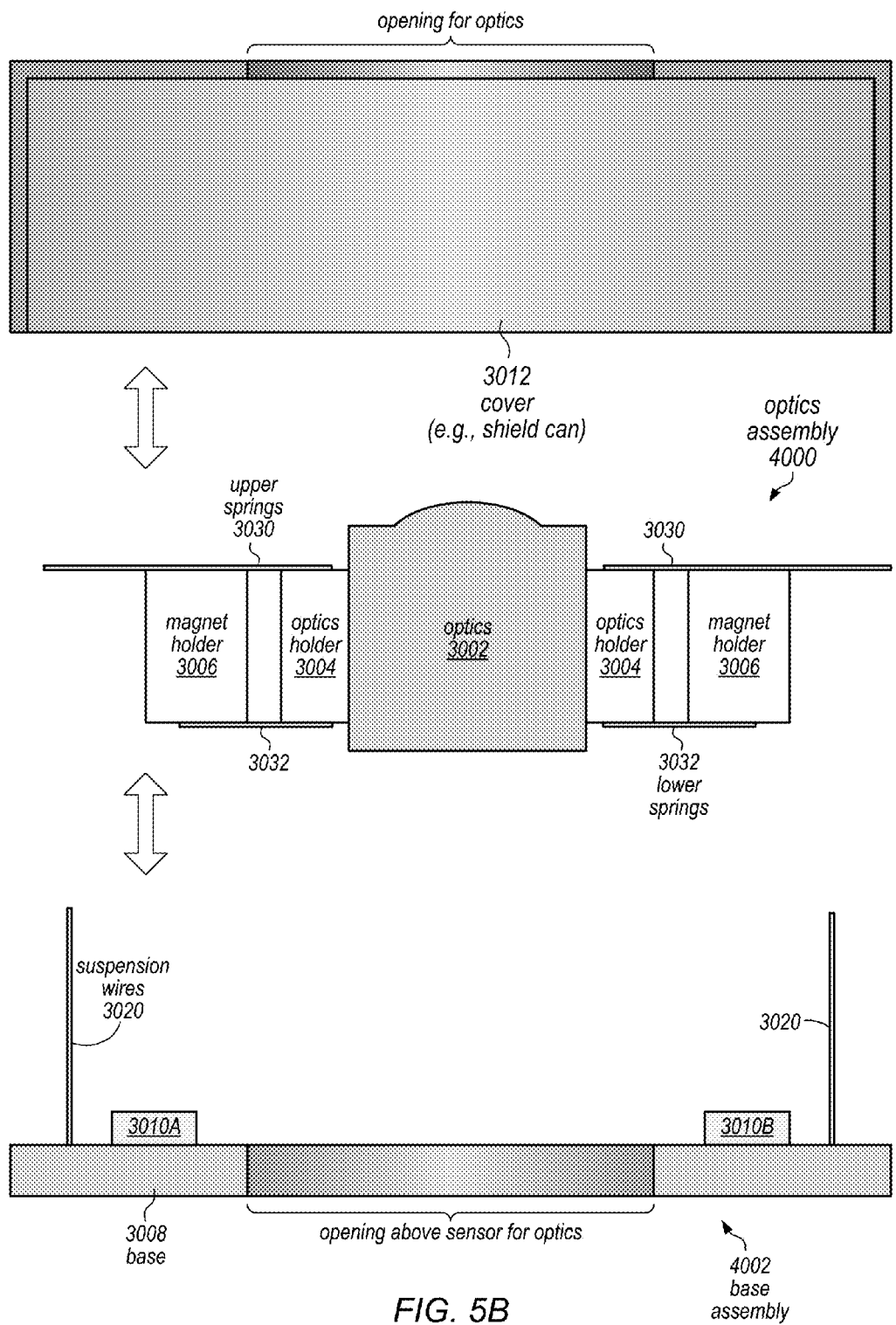
FIG. 5B shows the actuator module of FIG. 4 separated into three subassemblies—a base assembly, an optics assembly, and a cover—according to at least some embodiments.

FIGS. 4, 5A-5B, 6, and 7 illustrate embodiments of an example actuator module in which embodiments of a passive damping technique as described herein may be applied. In particular, embodiments of the passive damping technique may be applied within an actuator module 3000 as illustrated in FIGS. 4 and 5A to stabilize and increase control performance during optical image stabilization (OIS) of an optics assembly 4000 suspended on wires 3020 within an actuator module 3000 as shown in FIG. 5B. Details of example embodiments, implementations, and methods of operations of OIS VCM actuators such as the example actuator module 3000 shown in these Figures are provided in FIGS. 17 through 26 and in the section titled Example actuator modules.

FIG. 4 shows a side view of an example embodiment of an actuator module 3000 that may, for example, be used in small form factor cameras, according to at least some embodiments, and in which embodiments of a passive damping technique may be applied. FIG. 5A shows a top view of the actuator module 3000 of FIG. 4 with the cover removed. FIG. 5B shows the actuator module 3000 of FIG. 4 separated into three subassemblies—a base assembly 4002, an optics assembly 4000, and a cover 3012—according to at least some embodiments. In particular, FIG. 5B shows an optics assembly 4000 that may be suspended on wires 3020 of the base assembly 4002 of actuator module 3000 of FIGS. 4 and 5A, but removed from the assembled actuator module 3000.

As shown in FIGS. 4 and 5A-5B, an actuator module 3000 may include a base assembly 4002, an optics assembly 4000, and a cover 3012. Cover 3012 may be attached to the base assembly 4002, substantially enclosing the optics assembly 4000 while leaving an aperture to allow light from an object field in front of the actuator module 3000 to reach the optics 3002 and leaving an opening in base assembly 4002 to allow light refracted from optics 3002 to reach the image sensor 3050. Base assembly 4002 may include one or more of, but is not limited to, a base 3008, one or more magnet displacement sensors 3010, and suspension wires 3020. In at least some embodiments, there are four suspension wires 3020. An optics assembly 4000 may be suspended on the base assembly 4002 by suspension of the upper springs 3030 of optics assembly 4000 on the suspension wires 3020. Optics assembly 4000 may include one or more of, but is not limited to, optics 3002, optics holder 3004, magnet holder(s) 3006, upper spring(s) 3030, and lower spring(s) 3032. The upper and lower spring(s) may be collectively referred to herein as optics springs. In optics assembly 4000, an optics 3002 component (e.g., a lens or lens assembly) may be screwed, mounted or otherwise held in or by an optics holder 3004. In at least some embodiments, the optics 3002/optics holder 3004 assembly may be suspended from or attached to the magnet holder 3006 by upper spring(s) 3030, and lower spring(s) 3032. Note that upper spring(s) 3030 and lower spring(s) 3032 are flexible to allow the optics assembly 4000 a range of motion along the Z (optical) axis for optical focusing, and wires 3020 are flexible to allow a range of motion on the XY plane orthogonal to the optical axis for optical image stabilization. However, note that motion of the optics assembly 4000 on the Z axis and on the XY plane in actuator module 3000 as illustrated in FIGS. 4 and 5A-5B is undamped. In other words, the optics springs provide an undamped Z motion, while the suspension wires 3020 provide an undamped XY motion.

Note that, in some embodiments, an optics assembly 4000 of an actuator module 3000 may not include magnets and magnet holder(s) 3006, but may include a yoke or other structure 3006 that may be used to help support the optics assembly on suspension wires 3020 via upper sprigs 3030. However in some embodiments, optics assembly 4000 may not include elements 3006. In general, other embodiments of an optics assembly 4000 may include fewer or more components than the example optics assembly 4000 shown in FIG. 5B. Also note that, while embodiments show the optics assembly 4000 suspended on wires 3020, other mechanisms may be used to suspend an optics assembly 4000 in other embodiments.

Also note that, while embodiments of an actuator module 3000 are generally illustrated and described as allowing Z axis motion for the optics component 3002 within the optics assembly 4000 for focusing in addition to XY plane motion for OIS, embodiments of the passive damping techniques as described herein may also be applied in actuator modules in which the optics are not configured to move on the Z axis to provide passive damping for XY plane motion of an OIS mechanism.

FIG. 5A shows a top view of an example actuator module 3000, according to at least some embodiments, and is not intended to be limiting. In FIG. 5A, base 3008 and suspension wires 3020 are components of base assembly 4002 as shown in FIG. 5B, while optics 3002, optics holder 3004, magnet holders 3006, lower optics spring 3032, and upper optics spring 3030 are components of optics assembly 4000 as shown in FIG. 5B. The cover 3012 is not shown in FIG. 5A. FIG. 5A shows example locations for four suspension wires 3020 at the corners of the base assembly 4002 of the actuator module 3000, an example location/configuration of upper optics springs 3030 that suspend optics assembly 4000 on suspension wires 3020 and to which magnet holder(s) and optics holder 3004 are attached and thus suspended, and an example location/configuration of lower optics spring 3032 attached to the bottoms or lower surfaces of magnet holder(s) and optics holder 3004. Note that more or fewer suspension wires 3020 may be used in some embodiments.

Figure 6:
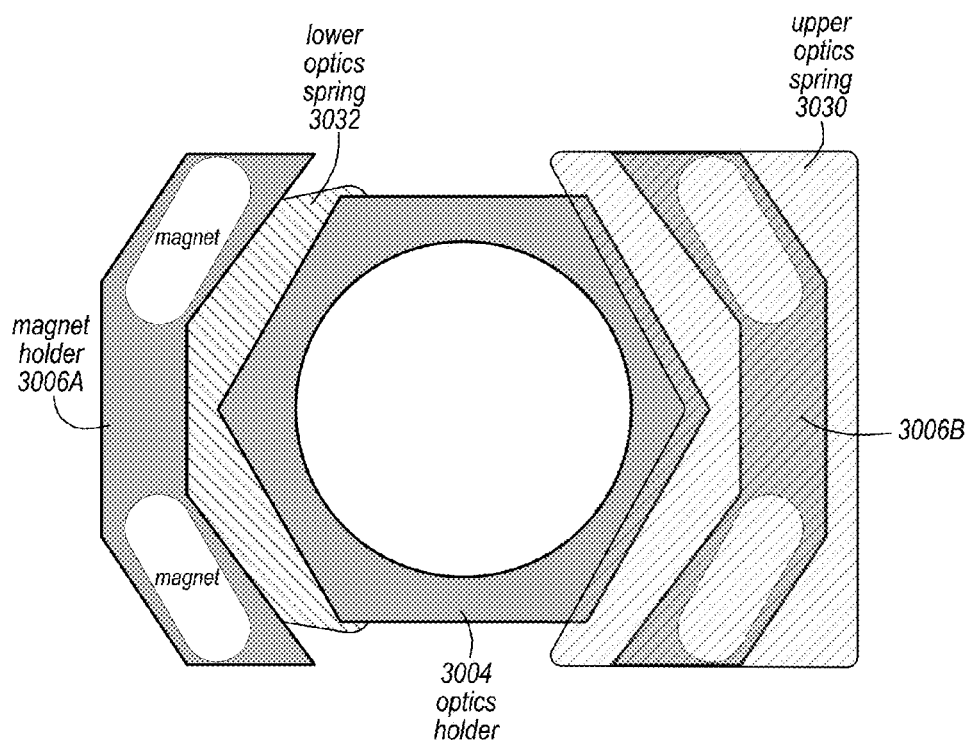
FIGS. 6 and 7 show alternative configurations for a magnet holder or yoke in an actuator module.
Figure 7:
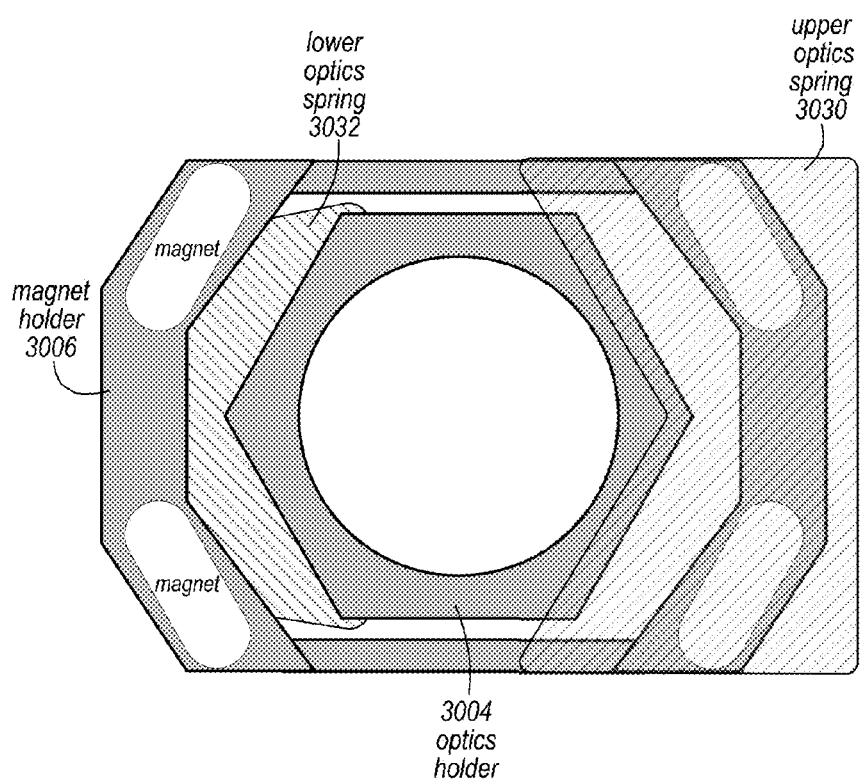

In the example configuration shown in FIG. 5A, four separate magnet holders 3006 are shown disposed around optics holder 3004, each attached to optics springs 3030 and 3032, and each typically holding one of four magnets used in the example actuator module 3000. FIGS. 6 and 7 show alternative configurations for a magnet holder or yoke in an actuator module 3000. FIG. 6 shows an embodiment in which there are two magnet holders 3006, each holding two magnets, with one magnet holder 3006 located on each side of optics holder 3004. FIG. 7 shows an embodiment in which there is a single magnet holder 3006 assembly that surrounds optics holder 3004 and that holds the four magnets. Note that more or fewer magnets may be used in some embodiments.

In embodiments of passive damping techniques for an actuator module as described herein, referring to FIG. 5B and to FIGS. 8, 9, and 10A-10D, the location(s) where the passive damping gel (or other passive damper) is applied is/are at the top of the moving assembly (the optics assembly 4000) and between the moving assembly (the optics assembly 4000) and a fixed component (e.g., cover 3012, attached to base 4002). In some embodiments, the locations where the passive dampers are applied may be between a magnet holder 3006 component of the optics assembly 4000 and the fixed component (cover 3012).

The location of the passive damping material at locations at the top of the optics assembly 4000 and between the optics assembly 4000 and the cover 3012 may be a favorable location for process control and automation during manufacturing and assembly of an actuator module 3000, as illustrated in FIGS. 13 through 16. In addition, at least some embodiments may include design elements that provide for the integrity and reliability of the damping gel over the life cycle of the actuator module 3000, for example design elements as illustrated in FIGS. 11, 12A, and 12B.

However, it is to be noted that passive dampers as described herein may be applied at one or more other locations within an actuator module 3000 instead of or in addition to locations at the top of the optics assembly 4000 and between the optics assembly and the cover 3012. For example, in some embodiments, instead of or in addition to locating passive dampers at the top of the optics assembly 4000 between the optics assembly 4000 and the cover 3012 of the actuator module 3000, passive dampers may be located at the bottom of the optics assembly 4000 between the optics assembly 4000 and the base 3008 of the actuator module 3000. For example, in some embodiments, the locations where the passive dampers are applied may be between a magnet holder 3006 component of the optics assembly 4000 and magnet displacement sensors 3010 attached to base 3008.

Figure 8:
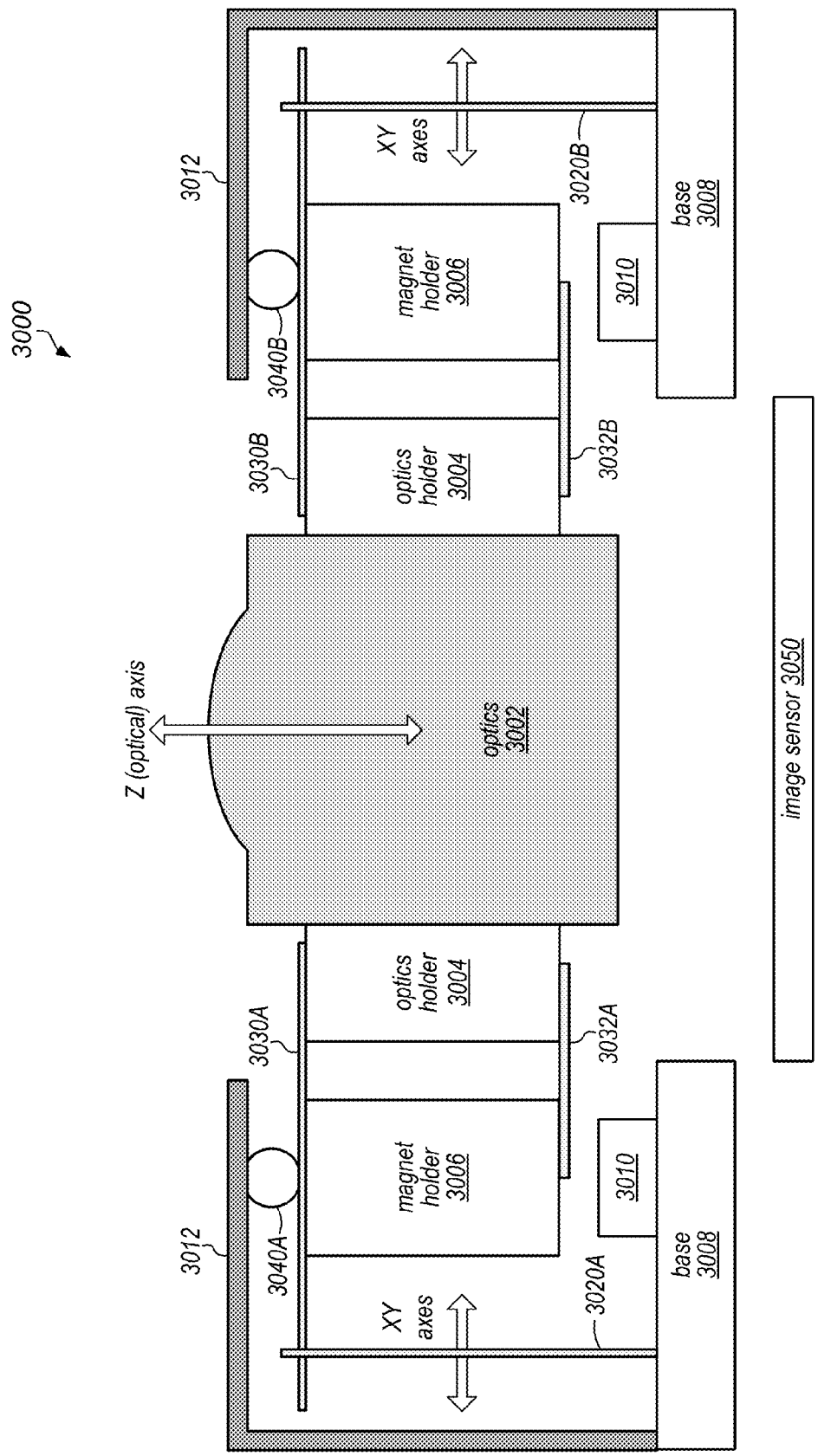
FIG. 8 illustrates a side view of an example actuator module that shows passive damping components (e.g., damping gel) located between an upper surface of the optics assembly and an inner surface of a fixed component such as a cover, according to at least some embodiments.

FIG. 8 illustrates a side view of an example actuator module 3000 as illustrated in FIGS. 5A through 7, and shows one or more locations of passive damping components, mechanisms, or materials 3040 (e.g., a damping gel such as a silicon damping gel), as applied or situated between an upper surface of the optics assembly 4000 and an inner surface of a cover 3012 as shown in FIG. 5B, according to at least some embodiments. For simplicity, each passive damping component in the module 3000 may be referred to as a passive damper 3040. In at least some embodiments, each passive damper 3040 may be an application of a silicon damping gel that may, for example, be cured by application of UV light. However, note that other gels, materials, substances, or mechanisms may be used as passive dampers 3040 at the locations shown in FIGS. 8 through 10D instead of or in addition to silicon damping gel dampers 3040.

As shown in FIG. 8 with reference to FIG. 5B, in at least some embodiments, the passive dampers (e.g., 3040A and 3040B) may be applied or disposed between the top of optics assembly 4000 and the inner surface of cover 3012. In various embodiments, passive dampers 3040 (e.g., silicon gel) may be applied to upper spring(s) 3030, to magnet holder(s) 3006, or to both. In any case, each passive damper 3040 contacts the top or upper surface of optics assembly 4000 and the inner surface of a fixed component of actuator module 3000 (e.g., cover 3012 when cover 3012 is attached to the base assembly 4002).

The application or disposition of passive dampers 3040 at these locations, physical properties of the passive damper 3040 material (e.g., a silicon gel) such as viscosity and/or elasticity (viscoelasticity), and the contact of the passive dampers with a surface of the moving component (optics assembly 4000) and with a surface of the fixed component (cover 3012) act to passively dampen the motion of optics assembly 4000 on the XY plane within the actuator module 3000 during optical image stabilization (OIS) of the optics assembly 4000 when subjected to external excitation or disturbance.

In some embodiments, in addition to damping motion on the XY plane, the passive dampers 3040 (e.g., damping gel) located on top of the optics assembly 4000 and disposed between the optics assembly 4000 and the cover 3012 may also act as a damper or "shock absorber" for a drop test event (Z axis damping), for example as illustrated in FIGS. 11, 12A, and 12B. This may improve drop test reliability, damping acceleration and reducing impact shock of the optics assembly 4000 within the actuator module 3000.

In addition, the location of the passive dampers 3040 at the top of the optics assembly 4000 and between the optics assembly 4000 and the cover 3012 may be a favorable location for process control and automation during manufacturing and assembly of an actuator module 3000, as illustrated in FIGS. 13 through 16. In addition, at least some embodiments may include design elements that provide for the integrity and reliability of the passive dampers 3040 over the life cycle of the actuator module 3000, for example design elements as illustrated in FIGS. 11, 12A, and 12B.

However, as previously noted, passive dampers 3040 may be applied at one or more other locations within an actuator module 3000 instead of or in addition to locations at the top of the optics assembly 4000 and between the optics assembly and the cover 3012 as shown in FIG. 8.

Figure 9:
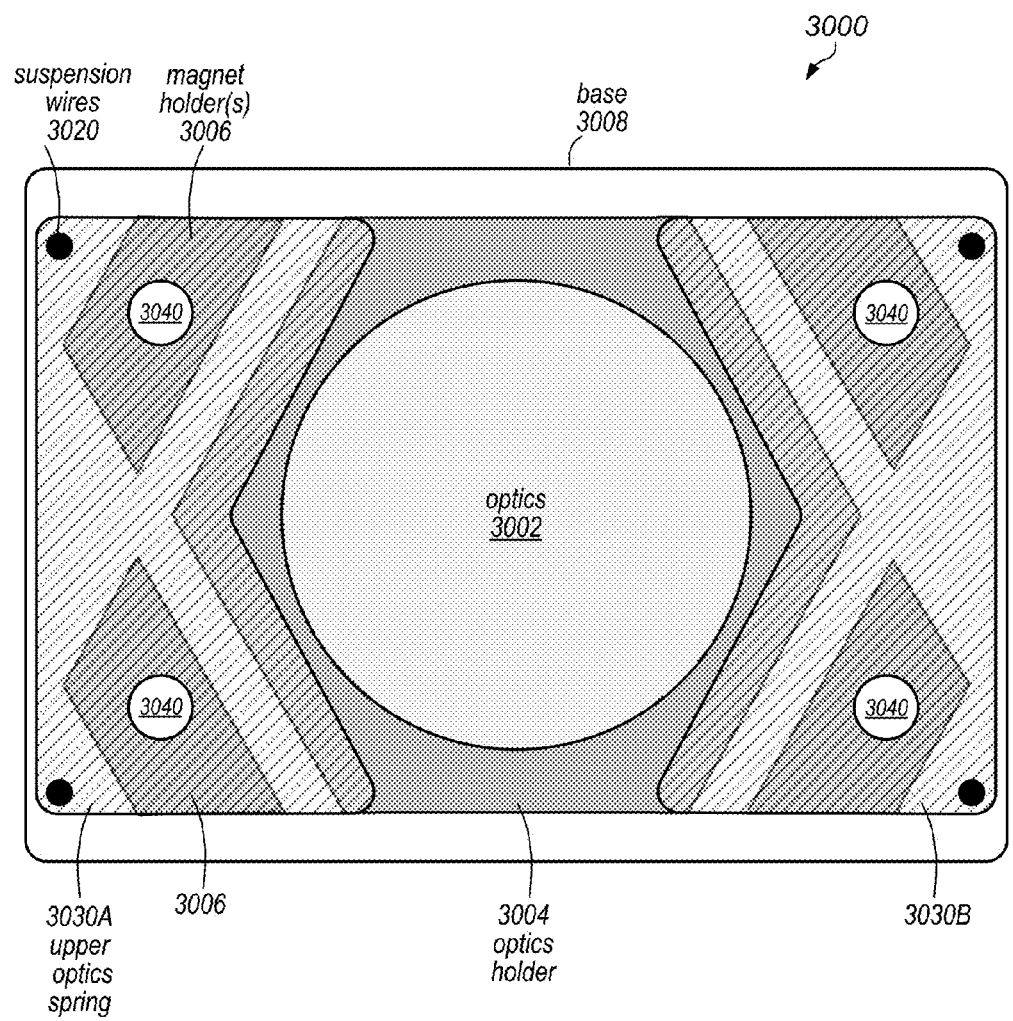
FIG. 9 shows a top view of the actuator module of FIG. 8 with the cover removed, and shows example locations for passive damping components on an upper surface of an optics assembly.

FIG. 9 shows a top view of the actuator module 3000 of FIG. 8 with the cover 3012 removed, and shows example locations for damping components on an upper surface of the optics assembly 4000. In this example, four passive dampers 3040 are disposed at locations substantially on top of the magnet holder(s) 3006 of the optics assembly 4000, with two dampers 3040 on each side of the actuator module 3000. In some embodiments, passive dampers 3040 may be applied to an upper surface of magnet holder(s) 3006. However, in some embodiments, passive dampers 3040 may instead (or in addition) be applied to a surface of upper optics spring(s) 3030 which may extend over the upper surface of holder(s) 3006. FIGS. 6 and 7 show alternative configurations for a magnet holder 3006 or yoke in an actuator module 3000 as shown in FIG. 9. Note that, while FIG. 9 show general locations for upper optics springs 3030 relative to other components of the actuator module 3000, the shapes shown are not limiting. Upper optics spring(s) 3030 may be substantially continuous sheets of a material of fairly simple shapes as shown in FIG. 9, may be much more complex shapes with gaps between arms, extensions, or complex windings of the spring 3030, may be composed of two or more separate portions instead of one portion on each side of optics holder 3004, or may be a single spring component similar in shape to the magnet holder 3006 shown in FIG. 7.

Figure 10A:
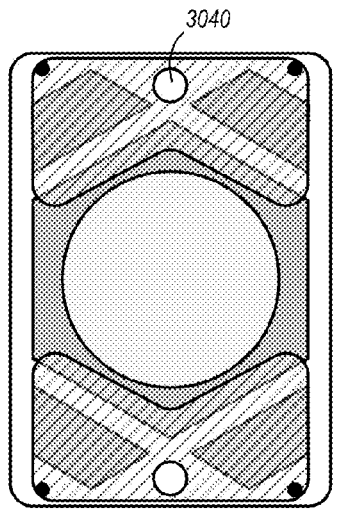
FIGS. 10A through 10D show alternative locations for passive damping components on the upper surface of an optics assembly.
Figure 10B:
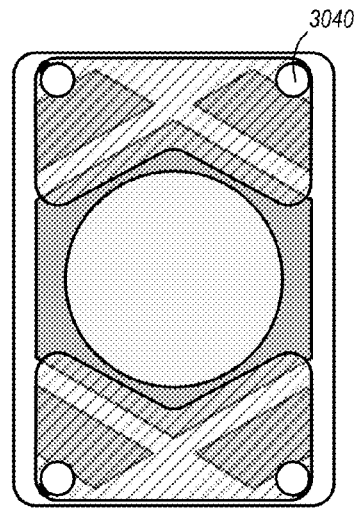
Figure 10C:
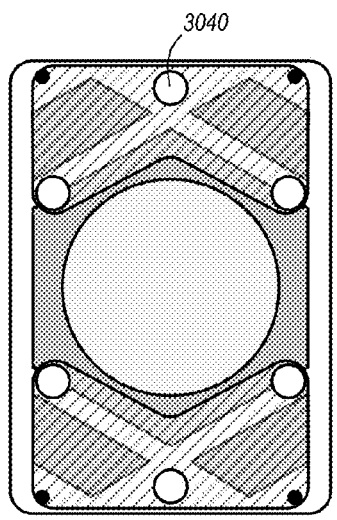
Figure 10D:
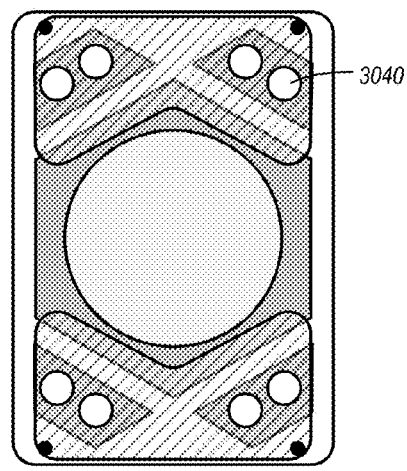

FIGS. 10A through 10D show several example alternative locations for passive dampers 3040 on the upper surface of the optics assembly, and are not intended to be limiting. FIG. 10A shows two passive dampers 3040 disposed at locations substantially on top of the upper optics springs 3030 of the optics assembly 4000, with one damper on each side of the actuator module 3000. FIG. 10B shows four passive dampers 3040 disposed at locations substantially above the suspension wires 3020 and on top of the upper optics springs 3030 of the optics assembly 4000, with two dampers on each side of the actuator module 3000. FIG. 10C shows a configuration similar to that of FIG. 10A, with two additional passive dampers 3040 on each side of actuator module 3000 and located at the outer extents of the upper optics springs 3020 at or near the optics holder 3004. FIG. 10D shows a configuration similar to that of FIG. 9, with four passive dampers 3040 on each side of the actuator module 3000, and with two passive dampers 3040 disposed on top of each magnet holder 3006 instead of one.

As shown in FIG. 8 in reference to FIG. 5B, in at least some embodiments, a passive damping material (e.g., a damping gel) may be applied on the upper side of the optics assembly 4000 and between the optics assembly 4000 which is configured to move in the XY plane for OIS within actuator module 3000, and a fixed component of the actuator module 3000 (e.g., cover 3012 (e.g., an electromagnetic interference (EMI) shield or screening can) attached to base assembly 4002. Benefits of this location for passive damping may include, but are not limited to, the following.

Applying the passive dampers 3040 between the moving mechanism (optics assembly 4000) and a fixed mechanism (cover 3012) of the actuator module 3000 may improve the level of damping performance and damping ratio (Q factor) as the relative motion between the moving and static parts reduces significantly. Note that this may impact gel volume, as less gel may be required to provide a target Q damping ratio. As a result, this may improve the manufacturability, dispense and cycle time.

By locating the passive dampers 3040 on top of the optics assembly 4000, the damping gel is further away from temperature sources such as the image sensor 3050 (e.g., a CMOS or CCD photosensor) and the voice coil motor (VCM) coils which may typically be located in or on base 3008. This may act to improve damping performance by reducing variation of the viscoelastic or other properties of the material (e.g., silicon gel) related to temperature.

In addition to damping an initial frequency mode $F_0$ as illustrated in FIG. 3 (XY plane damping), the passive dampers 3040 located on top of the optics assembly 4000 and disposed between the assembly 4000 and the cover 3012 may also act as a damper or "shock absorber" for a drop test event (Z axis damping), as illustrated in FIGS. 11, 12A, and 12B. This may improve drop test reliability, damping acceleration and reducing impact shock of the suspended mechanism (optics assembly 4000).

By locating the passive dampers 3040 on top of the optics assembly 4000, the damping gel can easily be dispensed during manufacturing and assembly of an actuator module 3000, since the passive damping is applied at an accessible location. The actuator module 3000 assembly process can be very specific, but typically the EMI shield can (cover 3012) is mounted last. In addition, this allows for improved process control and automation when applying the passive damping. Thus, this location of the passive damping material on top of the optics assembly 4000 may be a favorable design for process control and automation during manufacturing and assembly of an OIS VCM actuator module. An example manufacturing and assembly process is illustrated in FIGS. 13 through 16.

Passive Damper Integrity and Reliability

At least some embodiments may include design elements that provide for the integrity and reliability of the passive damping material (e.g., damping gel) over the life cycle of the actuator module 3000, as illustrated in FIGS. 11, 12A, and 12B. FIG. 11 illustrates compression of the damping components (damper modules 3040) during a drop test of an actuator module 3000, according to at least some embodiments. As illustrated in FIG. 11, in the event of a drop test, there is a Z displacement of the structure (optics assembly 4000) on the Z axis, which may compress the passive damper 3040 (e.g., damping gel) material. Thus, at least some embodiments may deposit each passive damper 3040 material at or in a site such as pocket, step, cavity, indentation, etc. on the top or upper surface of the optics assembly 4000 that may act to contain the passive damper 3040 material and help prevent the material from squeezing out or spreading too much during Z displacement events. FIGS. 12A and 12B illustrate an embodiment that includes a pocket in a top surface or component of an optics assembly 4000 to contain the passive damper 3040 (e.g., damping gel) material during compression against the cover 3012 during a Z axis displacement event as illustrated in FIG. 11, according to at least some embodiments. Note that the size (L×W×H) and/or shape of the pocket may be designed in accordance with the volume of the passive damper 3040 (e.g., damping gel) material. In other words, the pocket may be designed with a size and shape that can accommodate most or all of the passive damper 3040 (e.g., damping gel) material during compression resulting from a Z axis displacement.

Manufacturing, Process Control, and Automation Methods

Figure 15:
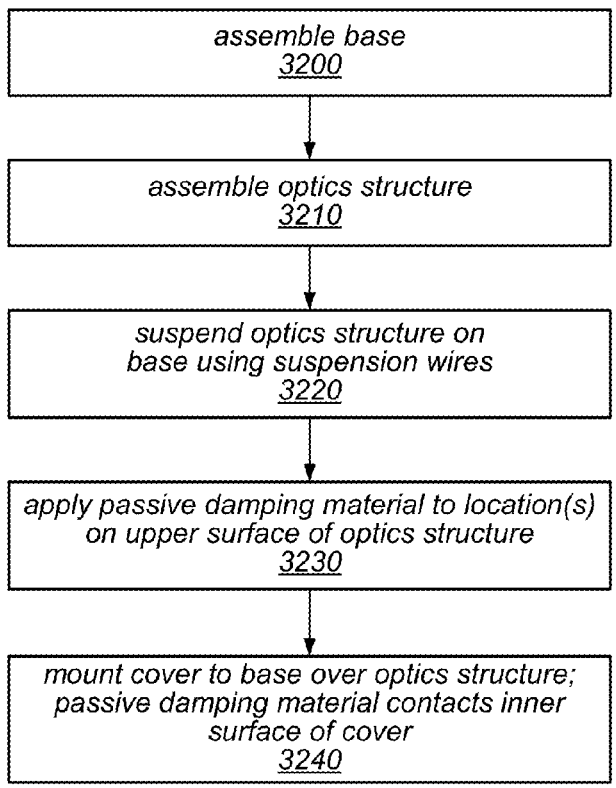
FIG. 15 is a flowchart of a method for manufacturing an actuator module that may be used in a small form factor camera, according to at least some embodiments.

FIGS. 13A through 13E graphically illustrate an example manufacturing process for an actuator module 3000 as shown in FIG. 8 that may be used in a small form factor camera, according to at least some embodiments, and is not intended to be limiting. The process is shown at a high level, with five major stages or steps shown in FIGS. 13A through 13E. FIG. 15 is a flowchart of a method for manufacturing an actuator module 3000 that may be used in a small form factor camera, according to at least some embodiments.

As shown in FIG. 13A and at 3200 of FIG. 15, a base assembly for an actuator module 3000 is assembled. An example base assembly 4002 is shown in FIG. 5B. However, the suspension wires 3020 may not initially be attached to the base assembly 4002.

As shown in FIG. 13B and at 3210 of FIG. 15, an optics assembly is assembled. An example optics assembly 4000 is shown in FIG. 5B. Note that the manufacturing steps represented in FIGS. 13A and 13B and at 3200 and 3210 of FIG. 15 may be performed substantially in parallel, e.g. on separate production lines that merge at FIG. 13C.

As shown in FIG. 13C and at 3220 of FIG. 15, the optics assembly (e.g., an optics assembly 4000) may be suspended on/attached to the base assembly (e.g., base assembly 4002) via suspension wires 3020, e.g., four wires or beams disposed at the corners of the base. In at least some embodiments, the optics assembly is suspended on the wires 3020 via upper optics spring 3030 components of the assembly 4000. The wires 3020 may provide motion to the optics assembly 4000 on the XY plane for optical image stabilization (OIS).

Figure 16:
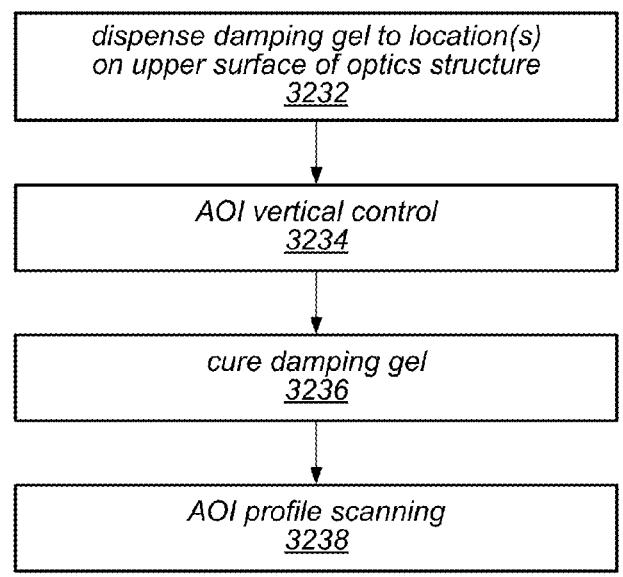
FIG. 16 is a flowchart of a method for damping gel application during the manufacturing process of FIG. 15, according to at least some embodiments.

As shown in FIG. 13D and at 3230 of FIG. 15, the passive damping material (e.g., a damping gel such as a silicon gel) is deposited on the upper surface of the optics assembly 4000. FIGS. 14A through 14D graphically illustrate an example method for passive damper 3040 (e.g., damping gel) material application as shown in FIG. 13D. FIG. 16 provides an example of a manufacturing method that may be performed at 3230 of FIG. 15 to apply damping gel to location(s) on an upper surface of an optics assembly 4000.

As shown in FIG. 13E and at 3240 of FIG. 15, a cover (e.g., a cover 3012 with an opening for the optics 3002 as shown in FIG. 5B) may be attached to the base assembly 4002, substantially enclosing the optics assembly 4000 while leaving an aperture in cover 3012 to allow light from an object field in front of the module 3000 to reach the optics 3002 and leaving an opening in base assembly 4002 to allow light refracted from optics 3002 to reach the image sensor 3050. The cover 3012 and base assembly 4002 form a fixed or static portion of the actuator module 3000, while the optics assembly 4000 is a moving portion of the actuator module 3000. The passive damping material applied in FIG. 13D may be disposed between the upper surface of the optics assembly 4000 and the inner surface of the cover 3012 when attached to the base assembly 4002. In at least some embodiments, each passive damper 3040 contacts the top or upper surface of the optics assembly 4000 and the inner surface of the fixed component of actuator module 3000 (e.g., the cover 3012 when cover 3012 is attached to the base assembly 4002).

The application of the passive dampers 3040 at these locations, physical properties of the passive damper 3040 material (e.g., a silicon gel) such as viscoelasticity, and the contact of the passive dampers with a surface of the moving component (optics assembly 4000) and with a surface of the fixed component (cover 3012) act to passively dampen the motion of optics assembly 4000 on the XY plane within the actuator module 3000 during optical image stabilization (OIS) of the optics assembly 4000 when subjected to external excitation or disturbance, and may also provide Z axis damping and reduce impact shock for the optics assembly 4000 as illustrated in FIGS. 11, 12A, and 12B.

FIGS. 14A through 14D graphically illustrate an example method for passive damping material (e.g., a damping gel such as a silicon gel) application as shown at FIG. 13D and at 3230 of FIG. 15, according to at least some embodiments, and is not intended to be limiting. The method may involve one or more of, but is not limited to, four stages or steps as shown as FIGS. 14A through 14D. FIG. 16 is a flowchart of a method for passive damping material application at element 3230 of the method shown in FIG. 15, according to at least some embodiments, and is not intended to be limiting.

Figure 14A:
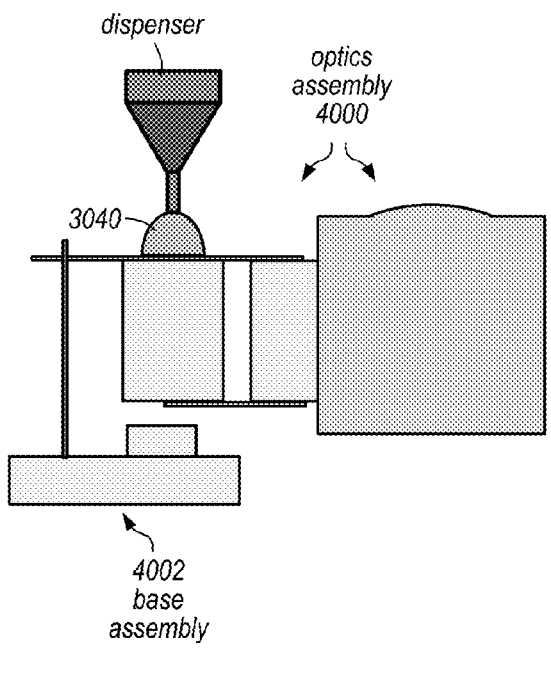

As shown in FIG. 14A and at 3232 of FIG. 16, the passive damper 3040 material (e.g., a silicon damping gel) is dispensed to one or more locations on the upper surface of an optics assembly 4000 as described herein.

Figure 14B:
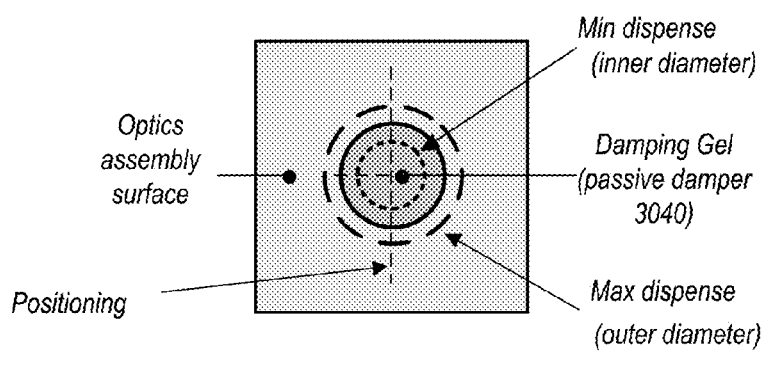

As shown in FIG. 14B and at 3234 of FIG. 16, a vertical automated optical inspection (AOI) may be performed to determine if the passive damper 3040 material is properly positioned on the optics assembly 4000 surface, and to determine that the extent of the material that was dispensed is within minimum and maximum boundaries. Note that this boundary check may also check the volume of damping material that was deposited.

As shown in FIG. 14C and at 3236 of FIG. 16, the passive damper 3040 material may be cured. For example, a silicon damping gel may be cured via the application of ultraviolet (UV) light by a UV light source at a distance d from the optics assembly surface.

As shown at in FIG. 14D and at 3238 of FIG. 16, an automated optical inspection (AOI) profile scan may be performed to determine if the passive damper 3040 material as cured at FIG. 14C and 3236 of FIG. 16 is within a height H tolerance and within a diameter D tolerance on the surface of the optics assembly 4000.

Example Actuator Modules

In some embodiments of an actuator module, a voice coil motor (VCM) mechanism is used as an actuator mechanism. In VCM actuators, a current carrying conductor in a magnetic field experiences a force proportional to the cross product of the current in the conductor and the magnetic field. This force is known as the Lorentz force. In some embodiments, the Lorentz force is greatest if the direction of the magnetic field is orthogonal to the direction of the current flow, and the resulting force on the conductor is orthogonal to both. The Lorentz force is proportional to the magnetic field density and the current through the conductor. Some embodiments may use an actuator designed to have a substantially constant magnetic field cutting the coil for all positions of the actuator, such that the force produced is proportional to the current through the conductor. Some embodiments make further use of voice coil motor (VCM) technology and include an actuator mechanism suitable for improving power consumption, performance, reducing size, and adding extra functionality, including optical image stabilization.

FIGS. 4 and 5A-5B are used to illustrate an example actuator module that may, for example, be used in small form factor cameras, according to some embodiments. FIG. 4 shows a side view of the actuator module 3000 including cover 3012, while FIG. 5A shows a top view of the actuator module 3000 with the cover removed. FIG. 5B shows the actuator module of FIG. 4 separated into three subassemblies—a base assembly 4002, an optics assembly 4000, and a cover 3012—according to at least some embodiments. In particular, FIG. 5B shows an optics assembly 4000 that may be suspended on wires 3020 in the base assembly 4002 of actuator module 3000 of FIGS. 4 and 5A, but removed from the assembled actuator module 3000.

In an example, non-limiting embodiment, actuator module 3000 may have a footprint of 9.9 mm (X) by 7.8 mm (Y), which are the linear dimensions orthogonal to the optical axis of the camera lens (optics 3002). The height is 3.3 mm (Z), which is parallel to the lens optical axis. Some embodiments may be designed to accommodate a diminished dimension Z, as the camera height limits the thickness of the cellphone, smartphone, tablet, or other multifunction device, which can be a competitive differentiator between multifunction device designs. Note that these dimensions are all given by way of example, and various embodiments may be larger or smaller in size in one or more of the X, Y, and/or Z dimensions.

Embodiments may enable favorable control over the dimension Y of actuators, which can be commercially valuable, as some embodiments may be used in cameras that are typically located above the display screen in smartphones or other multifunction devices. At least some embodiments of an actuator module 3000 may include, but are not limited to, upper springs 3030A and 3030B, lower springs 3032A and 3032B, a lens carrier or optics holder 3004, optical image stabilization (OIS) suspension wires 3020, and a cover 3012 such as a screening can. In at least some embodiments, base 3008 may be or may include an optical image stabilization flexible printed circuit (OIS FPC) with embedded coils. In at least some embodiments, there may be four OIS suspension wires 3020. In at least some embodiments, the wires 3020 may be located at or near the corners of the actuator module 3000 assembly.

In at least some embodiments, the actuator module 3000 includes magnet holder(s) 3006, which may also be referred to herein as a magnet yoke, optics yoke, or simply yoke. While FIG. 5A shows magnet holder 3006 as including four separate sections, each section holding one of the four magnets, in some embodiments magnet holder may instead include two separate sections or components as shown in FIG. 6, with one section 3006A on one side of optics holder 3004 and the other section 3006B on the other side of optics holder 3004, or alternatively may be assembled a single structure that surrounds optics holder 3004 as shown in FIG. 7. The actuator may also include optical image stabilization coils, which in some embodiments may be integrated with or attached to base 3008.

Still referring to FIG. 4 and FIGS. 5A-5B, in at least some embodiments, a basic autofocus voice coil motor (VCM) configuration of actuator module 3000 consists of a single autofocus coil (not shown) wound onto a lens carrier (optics holder 3004), into which the lens or lens assembly (optics 3002) may be subsequently mounted. For example, optics holder 3004 may be internally threaded, and a lens may be configured to screw into the holder 3004. A yoke component (magnet holder(s) 3006) supports and houses four magnets (not shown in FIGS. 4 and 5A-5B, but shown in FIGS. 6 and 7) in the corners. Each magnet is poled so as to generate a magnetic field, the useful component of which for the autofocus function is orthogonal to the optical (Z) axis of the camera/lens, and orthogonal to the plane of each magnet proximate to the autofocus coil, and where the field for all four magnets are all either directed towards the autofocus coil, or away from it, so that the Lorentz forces from all four magnets act in the same direction along the optical axis.

The yoke (e.g., magnet holder(s) 3006) may act as a support chassis structure for the optics assembly 4000 of the actuator module 3000. The lens carrier (optics holder 3004) may be suspended on the yoke by an upper autofocus (AF) spring 3030 and a lower optics spring 3032. In this way, when an electric current is applied to the autofocus coil, Lorentz forces are developed due to the presence of the four magnets, and a force substantially parallel to the optical (Z) axis is generated to move the lens carrier (optics holder 3004), and hence the lens (optics 3002), along the optical (Z) axis, relative to the support structure of the optics assembly 4000 of the actuator module 3000, so as to focus the lens. In addition to suspending the lens carrier (optics holder 3004) and substantially eliminating parasitic motions, the upper spring 3030 and lower spring 3032 may also resist the Lorentz forces, and hence convert the forces to a displacement of the lens.

This basic architecture shown in FIGS. 4 and 5A-5B is typical of some embodiments, in which optical image stabilization (OIS) functionality includes moving the entire optics assembly 4000 of the actuator module 3000 in linear (XY) directions orthogonal to the optical (Z) axis, in response to user handshake or other external excitations, as detected by some means, such a two or three axis gyroscope, which senses angular velocity. A motion of interest is the changing angular tilt of the camera in pitch and yaw directions, which can be compensated by linear movements of the lens relative to the image sensor and on the X and Y axes orthogonal to the optical (Z) axis.

At least some embodiments may achieve this two independent degree-of-freedom motion by using two pairs of optical image stabilization coils, each pair acting together to deliver controlled motion in one linear axis orthogonal to the optical axis, and each pair delivering controlled motion in a direction substantially orthogonal to the other pair. In at least some embodiments, these optical image stabilization coils may be fixed to the camera actuator support structure, and when current is appropriately applied, optical image stabilization coils may generate Lorentz forces on the entire optics assembly 4000 of the actuator module 3000, moving it in the XY plane as desired. The required magnetic fields for the Lorentz forces are produced by the same four magnets that enable to the Lorentz forces for the autofocus function. However, since the directions of motion of the optical image stabilization movements are orthogonal to the autofocus movements, it is the fringing field of the four magnets that are employed, which have components of magnetic field in directions parallel to the optical axis.

Figure 17:
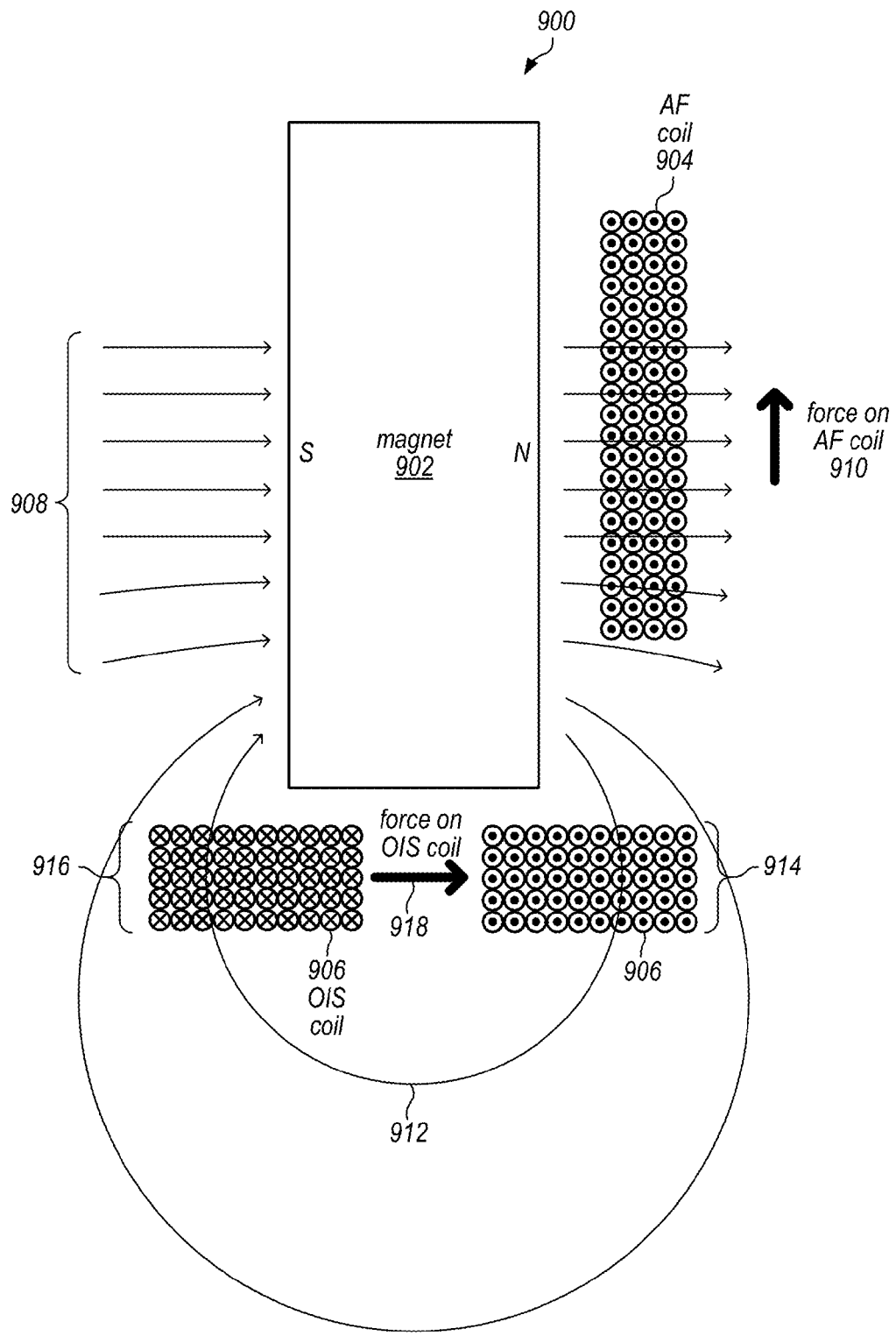
FIG. 17 illustrates a schematic view of a magnet and coil configuration, according to some embodiments.

FIG. 17 illustrates a schematic view of a magnet and coil configuration, according to some embodiments. FIG. 17 is a schematic representation 900 of a cross-section through one magnet 902, the autofocus coil 904 and an optical image stabilization coil 906. A magnetic field component 908 is 'horizontal' and enables the Lorentz force for the autofocus function 910. However, also note that the fringing field 912 cuts through each half of the optical image stabilization coil 906, with the 'vertical' component of the field 912 in the opposite direction in each half of the optical image stabilization coil 906. Note also that since the optical image stabilization coil 906 is contiguous, the direction of current flow in each half of the optical image stabilization coil 906 is also opposite. This is illustrated by the 'dots' 914 in each wire of one half of optical image stabilization coil 906 indicating current coming out of the page, while the 'crosses' 916 in each wire of the other half of optical image stabilization coil 906 indicating current going into the page. Hence the Lorentz force 918 generated in each half of optical image stabilization coil 906 is in the same direction, in this case to the right. And the Lorentz force in the autofocus coil 910 is upwards.

Returning to FIGS. 4 and 5A-5B, in at least some embodiments, the suspension of the optics assembly 4000 on the actuator module 3000 support structure (i.e., the base assembly 4002) may be achieved by the use of four corner wires 3020, for example wires with a circular cross-section. Each wire 3020 acts as a flexure beams capable of bending with relatively low stiffness, thus allowing motion in both optical image stabilization degrees-of-freedom (the X and Y axes). However, wire 3020 is in some embodiments relatively stiff in directions parallel to the optical (Z) axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 3020 is stiff in directions that require it to change in length, and hence the fixed points at the ends of each wire (eight points in total) will substantially form the vertices of a parallelepiped for all operational positions of the optical image stabilization mechanism.

Note that owing to the tough shock and drop testing requirements for multifunction devices, some embodiments may provide a means to decouple the optical image stabilization suspension wires from motions of the optics assembly 4000 along the optical axis caused by such shock. The decoupling means can be stiff at operational loads, but sufficiently compliant to accommodate the allowable motion of the optics assembly 4000, and hence prevent the corner wires from stretching and plastically deforming. The decoupling structure (which may be referred to as a wire mount) may be embodied as an extension to the autofocus upper spring 3030 in each corner. In this way the corner wires 3020 may be joined to the optics assembly 4000 via relatively short flexure springs, which are stiff, but allow some motion in extreme conditions.

Referring to FIGS. 5, 6, and 7, in some embodiments the magnets may be positioned at the corners of actuator module 3000, where the magnets, and the poling directions, are substantially 45 degrees to each side of the actuator module. However, in some embodiments, the magnets may be otherwise arranged or positioned, for example with the magnets at the sides instead of at the corners.

Referring briefly to FIG. 17, the use of the fringing field 912 of the magnet 902 implies that, in some embodiments, each optical image stabilization coil 906 has a larger footprint (width) than the thickness of the magnet. Some embodiments may exploit the observation that, for some applications, the X dimension of the camera is less important than the Y dimension, and the magnets and optical image stabilization coils are moved around the lens to eliminate any impact on the Y dimension.

Some embodiments may still maintain the 45-degree angle of the magnets and optical image stabilization coils, so that each pair of optical image stabilization coils produces forces substantially orthogonal to the other. However, now each of optical image stabilization coils produces a force that no longer acts through the optical axis, and hence generates a torque around the lens. To combat this, it may be noted that the torque produced by each of optical image stabilization coils is nominally equal in magnitude and opposite in direction to the torque produced by its diagonally opposite partner, hence there is nominally no net torque from the pair of optical image stabilization coils.

In addition, some embodiments provide a mapping to convert the handshake tilt as measured by a tilt sensor (most typically a gyroscope) to movement of the lens in the directions of the two 45 degree axes. In some embodiments, this configuration of magnets and optical image stabilization coils eliminates the impact on the camera Y dimension from the presence of these components, and the use of the fringing field.

Referring again to FIGS. 4 and 5A-5B, in some embodiments, the yoke (magnet holder 3006) forms a support structure for the optics assembly 4000, such that there are no molded support structure components to the optics assembly 4000. In some embodiments, the Y dimension of the camera may be determined by a stack up of dimensions, for example:

the lens (optics 3002) diameter;
the thickness of the lens carrier (optics holder 3004);
a gap between optics holder 3004 and the magnet holder 3006 (which may be needed to allow relative motion and manufacturing and assembly tolerances);
the thickness of the magnet holder 3006;
a gap between the magnet holder 3006 and the cover (e.g., screening can) 3012 (which may be needed to allow the optical image stabilization motion and manufacturing and assembly tolerances); and
the thickness of the cover 3012.

In at least some embodiments, the use of the yoke (magnet holder(s) 3006) as a support structure for the optics assembly 4000 may reduce a part of this stack, as the optics holder 3004 thickness may typically be 0.1 mm to 0.15 mm. Other variations that may be used in embodiments may include using a lens without a thread, and/or eliminating the lens carrier (optics holder 3004) altogether and mounting the autofocus coil directly on the lens (optics 3002).

In addition, some embodiments may split the autofocus coil into four corner coils so that the autofocus coil does not impact the Y dimension. However, such embodiments frequently use multi-pole magnets, which may reduce the fringing field and hence reduce the Lorentz forces for a given current in the optical image stabilization mechanism.

Still referring to FIGS. 4 and 5A-5B, in some embodiments, the use of the yoke (magnet holder(s) 3006) as the support structure for the optics assembly 4000 may also impact the Z dimension of the actuator module 3000. The upper spring(s) 3030 may be mounted directly onto the optics holder 3004, and hence the Z dimension of the structure may be minimized. In at least some embodiments, the electrical connections to the autofocus coil are made by splitting the upper spring 3030 into two pieces, and soldering one end of the autofocus coil to each half of the upper spring 3030. The electrical signals are then routed down the corner wires (not shown) to the optical image stabilization flexible printed circuit, which in some embodiments forms the base 3008 of, or is integrated with the base 3008 of, the actuator module 3000, and incorporates the embedded optical image stabilization coils (not shown). This electrical path employs electrical isolation from upper spring 3030 to the optics holder 3004, which is typically a deep drawn from a soft magnetic and electrically conductive sheet metal material. In some embodiments, this is achieved by coating the optics holder 3004 with some kind of non-conductive coating. As an alternative, some kind of thin insulating gasket or other layer is interposed between upper spring 3030 and optics holder 3004 in some embodiments. In either case, magnet holder(s) 3006 provide the structural support function of the optics assembly 4000, and form a rigid mount for upper spring 3030.

Some embodiments include mechanical connections of both upper spring 3030 and lower spring 3032 to the lens carrier (optics holder 3004), typically using a heatstaking process, whereby typically regions of upper spring 3030 and lower spring 3032 with holes are fitted over plastic posts on the optics holder 3004, which are then heated and pressed to form mushroom heads, hence retaining the upper spring 3030 and lower spring 3032. In some embodiments, these mechanical connections between the optics holder 3004 and upper spring 3030 and lower spring 3032 are disposed along the X-direction of the optics holder 3004 (i.e. they are closest to the two short sides of the actuator module 3000). In these embodiments, there are no mounting points in positions that would impact the Y dimension of the camera.

Some embodiments are designed to minimize the Z dimension of the actuator module 3000. Owing to the use of the yoke (magnet holder(s) 3006) as the support structure to which the upper spring 3030 is effectively bonded (albeit potentially through some kind of thin interposing layer), Upper spring 3030 is at the top of the optics assembly 4000. In some embodiments, the method of attaching the corner wires to the upper spring 3030 is to make a solder joint on the top and more accessible side of the upper spring 3030 and wire in the corners. This means that a solder ball is accommodated on the top side of the upper spring 3030. In this way, the some embodiments solve this issue by forming the corners of the upper spring 3030 to make room for the solder ball without impacting the Z dimension. This forming process may introduce variability into these corner regions of the upper spring 3030, and hence may be undesirable from a manufacturing perspective. However a tolerance analysis shows that, in some embodiments, this variability has a negligible effect on factors such as stiffness and tilt, and hence may be viable.

Still referring to FIGS. 4 and 5A-5B, some embodiments may incorporate the use of magnet displacement sensors 3010 (e.g., Hall sensors) as position sensors of the optical image stabilization mechanism. While shown on top of base 3008, in some embodiments sensors 3010 may instead be integrated with, or below, base 3008. In at least some embodiments, sensors 3010 may sense the position of the optics assembly 4000 based on the same fringing field as used by the optical image stabilization coils to generate the Lorentz forces. In this way, extra magnets for use with the sensors 3010 may be avoided.

Voice Coil Motor Drive Scheme

FIGS. 4 and 5A-5B illustrate an example actuator module that may, for example, be used in small form factor cameras, according to some embodiments. Some embodiments of an actuator module 3000 may provide a drive scheme for an actuator mechanism of a miniature or small form factor camera, such as may be used in a mobile handheld device or other multifunction device. Some embodiments provide a voice coil motor actuator configuration, which uses 'fixed' magnets and a moving coil around a lens carrier, on or in which is mounted a lens. Some embodiments further incorporate a method for arranging the actuator mechanism and a method of driving the actuator mechanism with linear current and voltage sources so as to avoid electrical noise that may disturb the quality of the camera images, or other sensitive devices in the product.

In some embodiments, an actuator module 3000 includes four separate autofocus coils, one in each corner of the actuator module 3000, each accompanied by its own magnet. In some embodiments, there is a size advantage to this arrangement, because the autofocus coil no longer proceeds all the way around the lens carrier, and hence reduces or minimizes the size of the actuator module 3000. In order to deliver Lorentz forces in the same direction from each side of each coil, some embodiments use dual-pole magnets, where the domains in different portions of the magnet are aligned in opposite directions.

Figure 18:
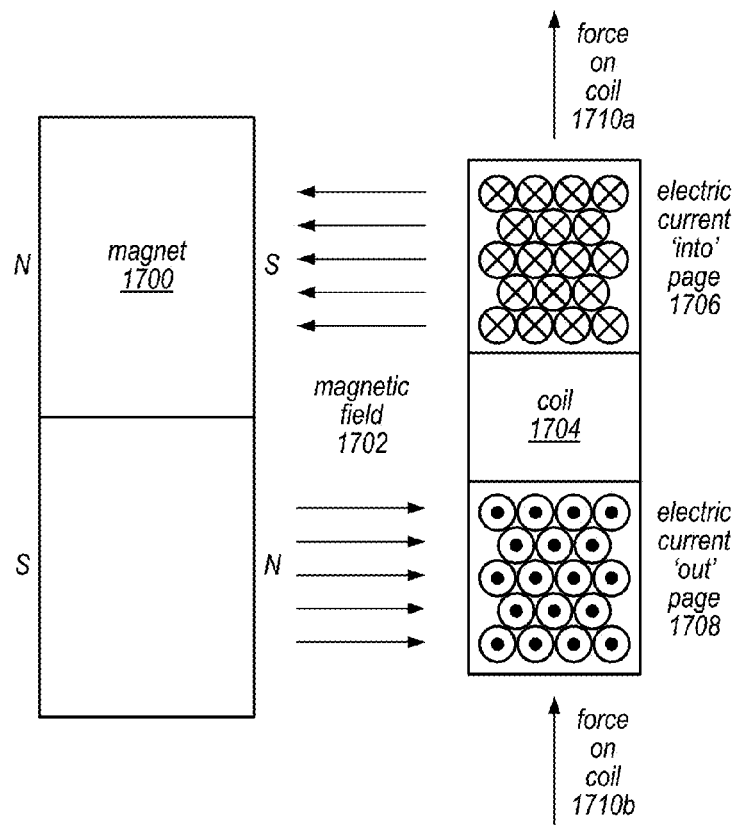
FIG. 18 depicts a schematic of magnet and coil configuration, according to some embodiments.

FIG. 18 depicts a schematic of magnet and coil configuration, according to some embodiments. A magnet 1700 and accompanying magnetic field 1702 are shown in conjunction with a coil 1704. Electric current into the page 1706 and electric current out of the page 1708 are shown, as are force on the coil 1710a-1710b.

Figure 19:
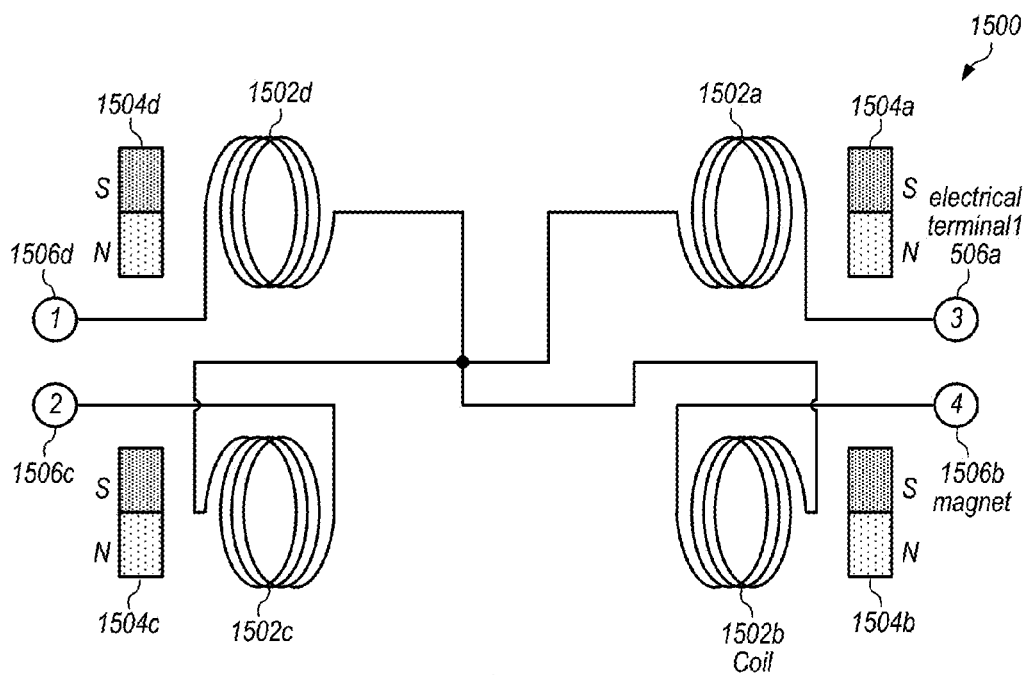
FIG. 19 depicts a schematic representation of actuator coil connectivity, according to some embodiments.

FIG. 19 depicts a schematic representation of actuator coil connectivity, according to some embodiments. There are four separate coils 1502a-1502d and magnets 1504a-1504d, and four terminals 1506a-1506d, with the other terminal of each of coil 1502a-1502d connected together. Some embodiments may be configured to drive the different coils 1502a-1502d independently. In this way it is possible to deliver active tilt control of the lens relative to the image sensor, in addition to active focus control, so long as it is possible to drive the coils 1502a-1502d to control tilt about two axes orthogonal to each other and both orthogonal to the optical axis.

In some embodiments, this is achieved by operating the coils 1502a-1502d so that diagonally opposite coils 1502a-1502d deliver control of the tilt about an axis close to the other diagonal. In addition, coils 1502a-1502d adjacent to each other are wound, or electrically connected opposite to each other, or the magnets must be poled oppositely. So that for example if one of coils 1502a-1502d is driven with a 'positive' current, and the adjacent one of coils 1502a-1502d is driven with a 'negative' current, then the Lorentz forces from both on the lens carrier will be in the same direction along the optical axis. In addition, in some embodiments all coils 1502a-1502d are capable of being driven with currents of either polarity, so that the actuators are bi-directional. This means that if diagonally opposite coils 1502a-1502d are driven with electrical current of the same polarity, they will both generate forces on the lens carrier in the same direction parallel to the lens optical axis.

Some embodiments include a method of driving these coils 1502a-1502d using multiple linear current drives. Such embodiments are advantageous as it minimizes the electrical noise that could adversely affect the quality of the images captured by the image sensor, or other components in the product that might be susceptible to noise.

Some embodiments demonstrate that the four coils may be configured and driven to achieve three degrees of controlled motion of the lens relative to the image sensor: linear movement parallel to the optical axis and tilts about axes orthogonal to the optical axis. In some embodiments, these extra tilt degrees of freedom augment camera performance by substantially eliminating the relative tilt between the lens optical axis, and an axis orthogonal to the plane of the image sensor. Nominally these axes should be parallel, however manufacturing tolerances, and inertial effects of the lens can introduce parasitic relative tilts.

For example, manufacturing tolerances may mean that for a given camera, when at its neutral position, the lens optical axis is naturally tilted to an axis orthogonal to the plane of the image sensor. In addition, further tolerances may mean that at different focal positions (or optical image stabilization positions if present), the relative tilt may be different. In addition, particularly for complex and size constrained mechanisms, such as the optical image stabilization positions mechanism, the center of gravity of the lens is not necessarily located as the center of the lens suspension structure, meaning that different orientations of the camera may alter the tilt of the lens relative to the image sensor (known as posture dependent tilt). Hence, for these reasons, the addition of active tilt compensation, potentially based on a factory calibration, on sensors that detect the orientation of the camera, or on feedback from captured images, will be advantageous to camera performance and image quality.

In some embodiments, the actuator arrangement controls the movement of the lens relative to the image sensor in three degrees of freedom, however the actuator mechanism is made up of four separate coils, each of which is potentially driven with different electric currents. Hence there appears to be a static indeterminacy. Another way of describing the problem is that a necessary constraint on the electrical drive of the system is that the electrical currents through the four coils must all sum to zero, so that in practice there are not four independent choices of electrical current through the coil: only three.

Some embodiments address this problem by driving three of the four coils with bi-directional programmable current sources, for example terminals 1, 2 and 3, whilst terminal 4 is then driven with a voltage source. The voltage source effectively ensures the voltage of the central node, to which one terminal of each coil is connected, is held at a roughly known or constant voltage, via the resistance of the coil 4. The voltage source can sink or source as much current as is necessary to ensure the currents sum to zero. The voltage source does not determine the current through coil 4, this is determined by the combined currents through coils 1, 2 and 3. In practice the Lorentz force sensitivity of each coil will show variability due to manufacturing tolerances. In addition, the different programmable current sources for terminals 1, 2 and 3 will also show variability due to manufacturing tolerances. These and other sources of variability will alter the actual angle and position of the Lens relative to the image sensor for a given series of programmed currents. All these effects can be accounted for by performing a calibration process, whereby for a series of currents applied to the different terminals, the actual position and angle of the lens is measured. Parameters in the control algorithms that alter the effective gain and offset of each coil and magnet can then be determined, and used to accurately position and tilt the lens.

Optics Image Stabilization System and Methods

Figure 20:
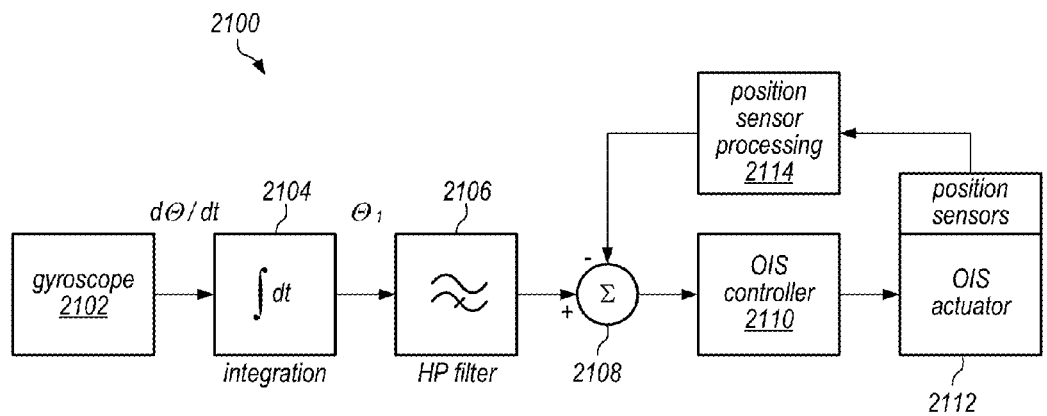
FIG. 20 depicts a system for optical image stabilization, according to some embodiments.

FIG. 20 depicts a system for optical image stabilization in an actuator assembly 3000, according to some embodiments. A camera control 2100 includes various components described below. A gyroscope 2102 or other motion/position sensor transmits a derivative of orientation angle with respect to time to an integration unit 2104, which transmits an orientation angle to a high-pass filter 2106. High-pass filter 2106 filters this angle to transmit a signal to a subtraction unit 2108, which also receives input from a position sensing processor 2114. The subtractive output of subtraction unit 2109 is transmitted to an optical image stabilization controller 2110, which sends signals to activate actuators coupled to position sensors 2112. Position sensors coupled to actuators 2112 transmit a signal to the position sensor processor 2114.

Figure 21:
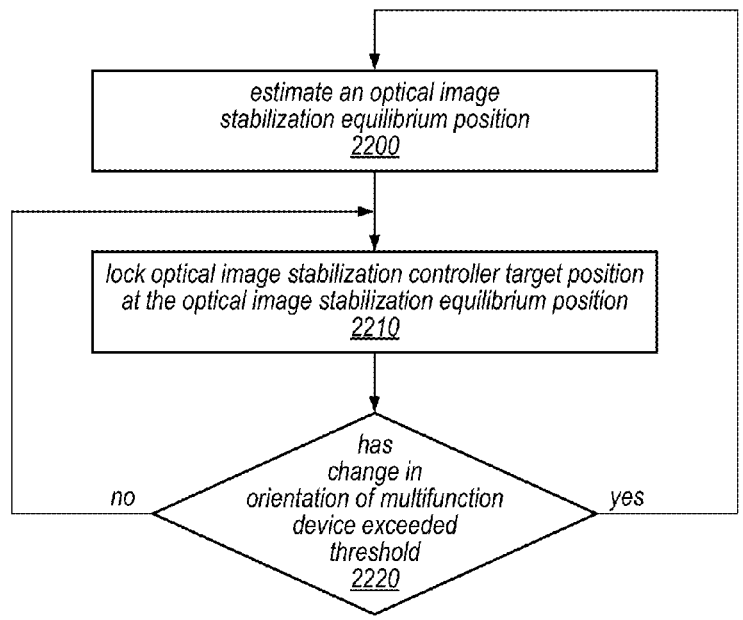
FIG. 21 is a flowchart of a method for optical image stabilization, according to some embodiments.

FIG. 21 is a flowchart of a method for optical image stabilization in an actuator assembly 3000, according to some embodiments. An optical image stabilization equilibrium position is estimated (block 2200). The optical image stabilization controller target position is locked at the optical image stabilization equilibrium position (block 2210). A determination is made as to whether change in orientation of the multifunction device exceeded a threshold (block 2220). If the change has exceeded the threshold, the process returns to step 2200, which is described above. If the change has not exceeded the threshold, then the process returns to step 2210, which is described above.

Figure 22:
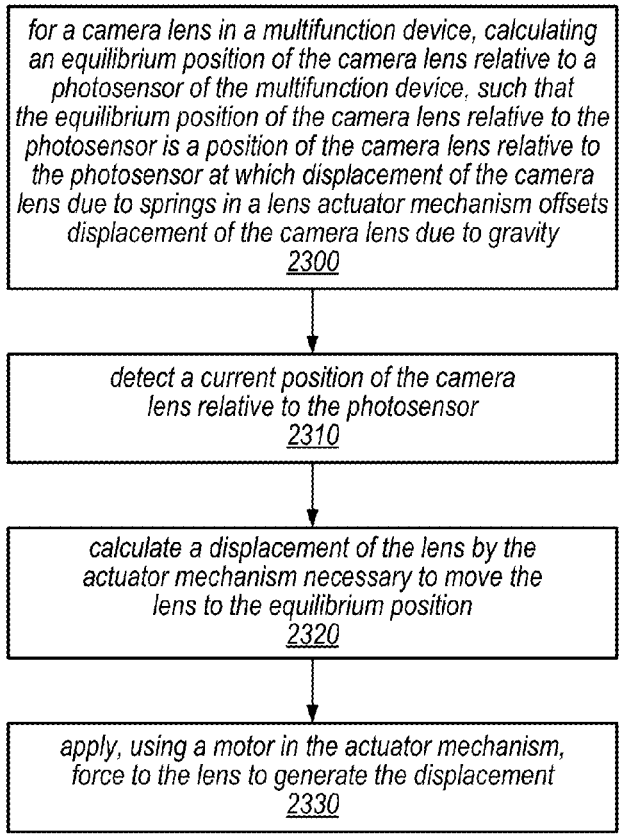
FIG. 22 is a flowchart of a method for optical image stabilization, according to some embodiments.

FIG. 22 is a flowchart of a method for optical image stabilization in an actuator assembly 3000, according to some embodiments. For a camera lens in a multifunction device (e.g., optics 3002 in FIG. 4), an equilibrium position of the camera lens relative to a photosensor of the multifunction device (image sensor 3050 in FIG. 4) is calculated, such that the equilibrium position of the camera lens relative to the photosensor is a position of the camera lens relative to the photosensor at which displacement of the camera lens due to springs in a lens actuator mechanism offsets displacement of the camera lens due to gravity (block 2300). A current position of the camera lens relative to the photosensor is detected (block 2310). A displacement of the lens by the actuator mechanism necessary to move the lens to the equilibrium position is calculated (block 2320). Using a motor in the actuator mechanism, force is applied to the lens to generate the displacement (block 2330). In at least some embodiments, passive dampers 3040 as shown in FIGS. 8 and 9, located between a moving portion (e.g., an optics assembly 4000 as shown in FIG. 5B) and a fixed component (e.g., a cover 3012 attached to a base assembly 4002 as shown in FIG. 5B) of the actuator module 3000 may act to passively dampen the motion of the optics assembly 4000 on the XY plane within the OIS VCM actuator module 3000 during optical image stabilization (OIS) of the optics assembly 4000 when subjected to external excitation or disturbance, and may also provide Z axis damping and reduce impact shock on the optics assembly 4000.

Figure 23:
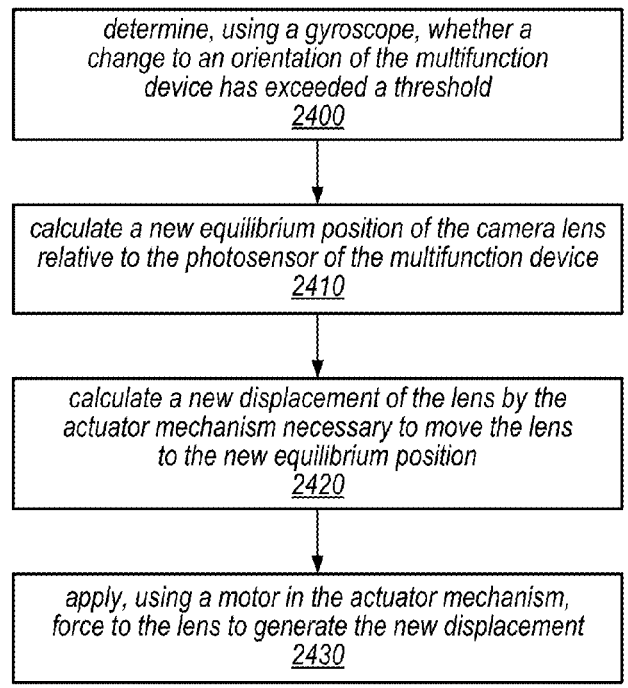
FIG. 23 is a flowchart of a method for optical image stabilization, according to some embodiments.

FIG. 23 is a flowchart of a method for optical image stabilization in an actuator assembly 3000, according to some embodiments. Using a gyroscope or other motion/position sensor, a determination is made as to whether a change to an orientation of the multifunction device has exceeded a threshold (block 2400). A new equilibrium position of the camera lens relative to the photosensor of the multifunction device is calculated (block 2410). A new displacement of the lens by the actuator mechanism necessary to move the lens to the new equilibrium position is calculated (block 2420). Using a motor in the actuator mechanism, force is applied to the lens to generate the new displacement (block 2430). In at least some embodiments, passive dampers 3040 as shown in FIGS. 8 and 9, located between a moving portion (e.g., an optics assembly 4000 as shown in FIG. 5B) and a fixed component (e.g., a cover 3012 attached to a base assembly 4002 as shown in FIG. 5B) of the actuator module 3000 may act to passively dampen the motion of the optics assembly 4000 on the XY plane within the OIS VCM actuator module 3000 during optical image stabilization (OIS) of the optics assembly 4000 when subjected to external excitation or disturbance, and may also provide Z axis damping and reduce impact shock on the optics assembly 4000.

Figure 24:
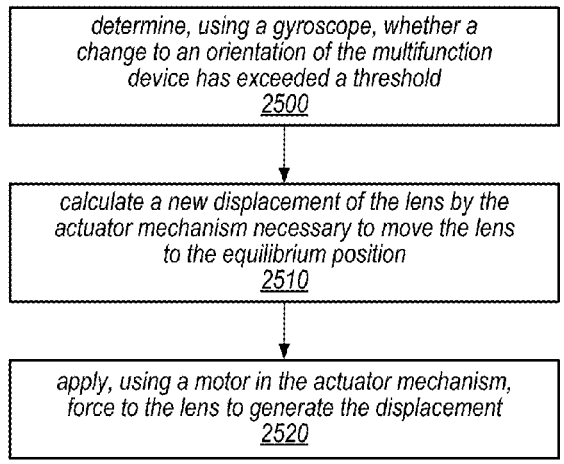
FIG. 24 is a flowchart of a method for optical image stabilization, according to some embodiments.

FIG. 24 is a flowchart of a method for optical image stabilization in an actuator assembly 3000, according to some embodiments. Using a gyroscope or other motion/position sensor, a determination is made as to whether a change to an orientation of the multifunction device has exceeded a threshold (block 2500). A new displacement of the lens by the actuator mechanism necessary to move the lens to the equilibrium position is calculated (block 2510). Using a motor in the actuator mechanism, force is applied to the lens to generate the displacement (block 2520). In at least some embodiments, passive dampers 3040 as shown in FIGS. 8 and 9, located between a moving portion (e.g., an optics assembly 4000 as shown in FIG. 5B) and a fixed component (e.g., a cover 3012 attached to a base assembly 4002 as shown in FIG. 5B) of the actuator module 3000 may act to passively dampen the motion of the optics assembly 4000 on the XY plane within the OIS VCM actuator module 3000 during optical image stabilization (OIS) of the optics assembly 4000 when subjected to external excitation or disturbance, and may also provide Z axis damping and reduce impact shock on the optics assembly 4000.

Figure 25:
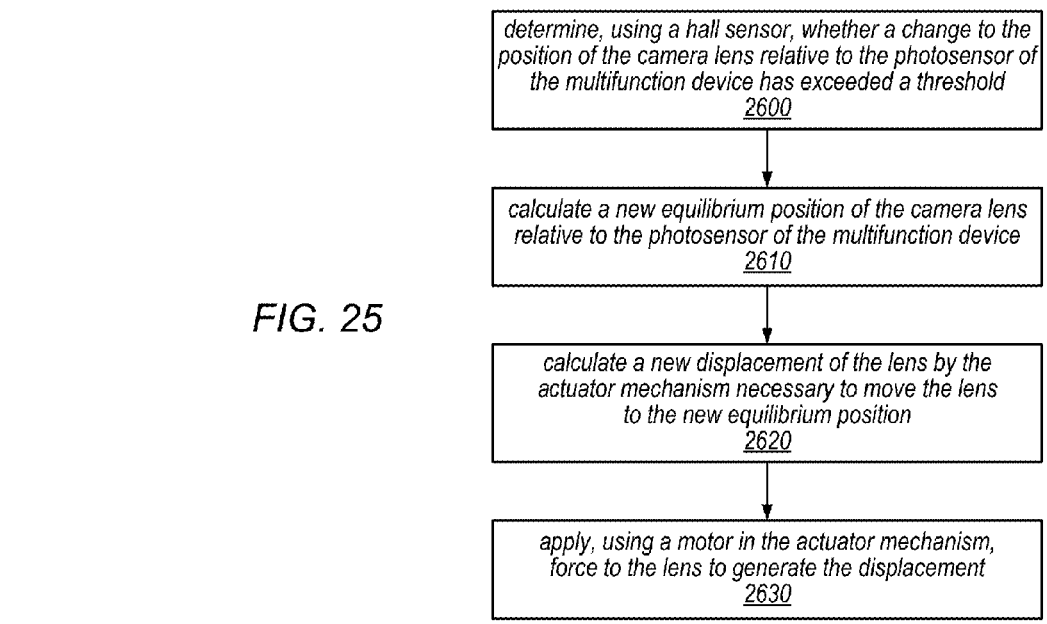
FIG. 25 is a flowchart of a method for optical image stabilization, according to some embodiments.

FIG. 25 is a flowchart of a method for optical image stabilization in an actuator assembly 3000, according to some embodiments. Using a Hall sensor, a determination is made as to whether a change to the position of the camera lens relative to the photosensor of the multifunction device has exceeded a threshold (block 2600). A new equilibrium position of the camera lens relative to the photosensor of the multifunction device is calculated (block 2610). A new displacement of the lens by the actuator mechanism necessary to move the lens to the new equilibrium position is calculated (block 2620). Using a motor in the actuator mechanism, force is applied to the lens to generate the displacement (block 2630). In at least some embodiments, passive dampers 3040 as shown in FIGS. 8 and 9, located between a moving portion (e.g., an optics assembly 4000 as shown in FIG. 5B) and a fixed component (e.g., a cover 3012 attached to a base assembly 4002 as shown in FIG. 5B) of the actuator module 3000 may act to passively dampen the motion of the optics assembly 4000 on the XY plane within the OIS VCM actuator module 3000 during optical image stabilization (OIS) of the optics assembly 4000 when subjected to external excitation or disturbance, and may also provide Z axis damping and reduce impact shock on the optics assembly 4000.

Figure 26:
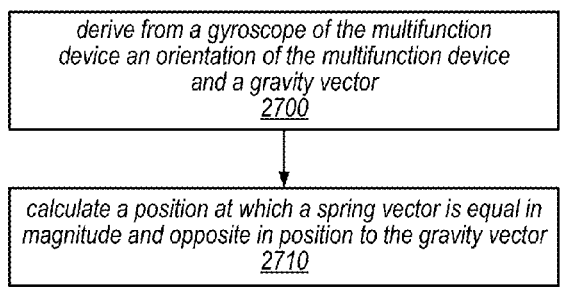
FIG. 26 is a flowchart of calculations used in a method for optical image stabilization, according to some embodiments.

FIG. 26 is a flowchart of calculations that may be used in a method for optical image stabilization in an actuator assembly 3000, according to some embodiments. An orientation of the multifunction device and a gravity vector may be derived from a gyroscope or other motion/position sensor device (block 2700). In some embodiments, deriving an orientation of the multifunction device and a gravity vector may include filtering motion/position (e.g., gyroscopic) data to eliminate low-frequency motion components of motion of the multifunction device. A position at which a spring vector is equal in magnitude and opposite in position to the gravity vector may be calculated (block 2710).

Multifunction Device Examples

Embodiments of electronic devices in which embodiments of actuator modules 3000 as described herein may be used, user interfaces for such devices, and associated processes for using such devices are described. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 27:
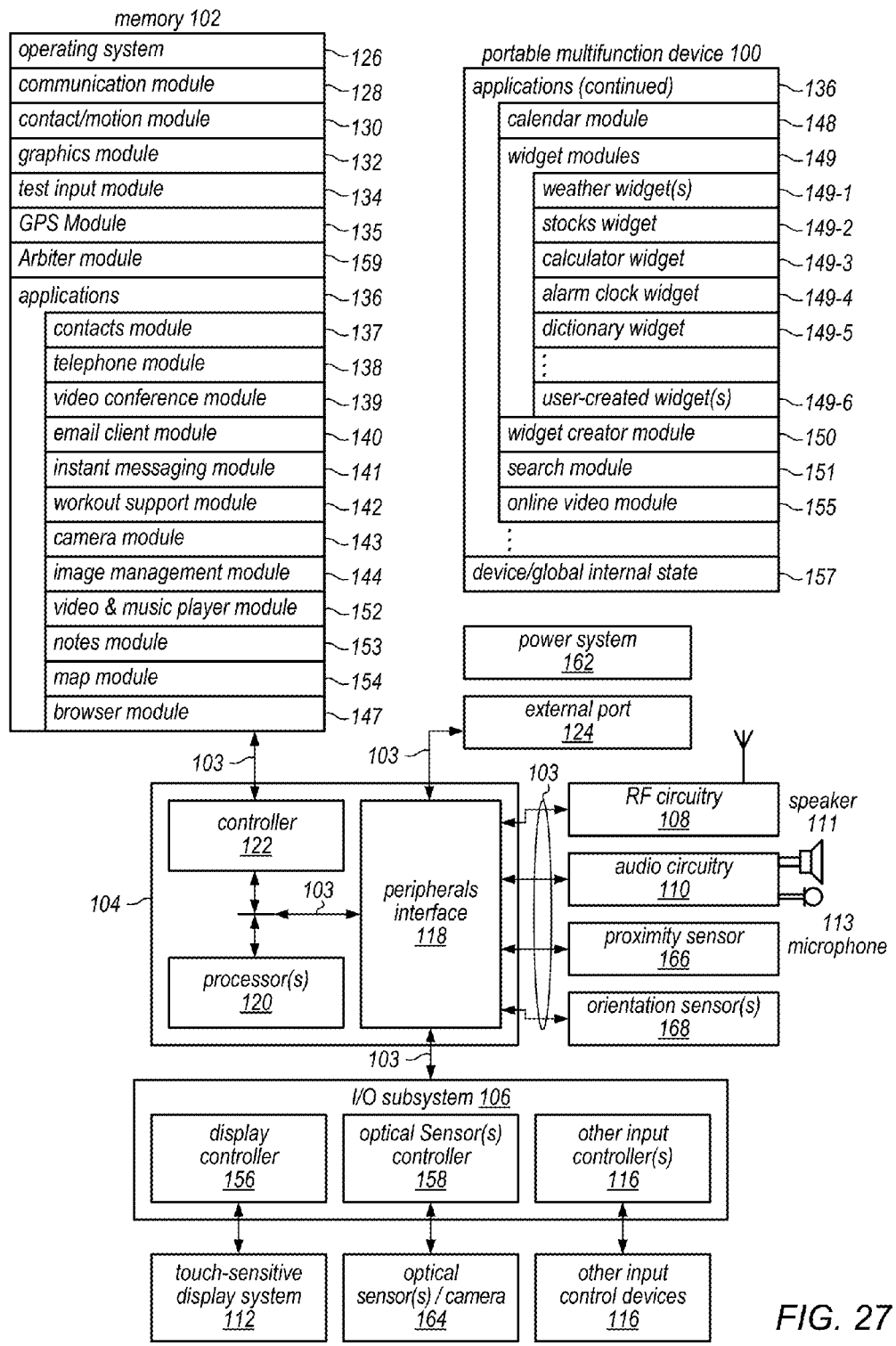
FIG. 27 illustrates a block diagram of a portable multifunction device with a camera in accordance with some embodiments.

Attention is now directed toward embodiments of portable devices with cameras. FIG. 27 is a block diagram illustrating portable multifunction device 100 with camera 164 in accordance with some embodiments. Camera 164 is sometimes called an "optical sensor" for convenience, and may also be known as or called an optical sensor system. Embodiments of an actuator module 3000 that includes passive damping for optical image stabilization (OIS) may be used in the optical sensor/camera(s) 164 of a device 100.

Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 27 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternative embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology may be used.

Touch screen 112 may have a video resolution in excess of 100 dots per inch (dpi). In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 27 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 100 may also include one or more proximity sensors 166. FIG. 27 shows proximity sensor 166 coupled to peripherals interface 118. Alternatively, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 27 shows the one or more orientation sensors 168 coupled to peripherals interface 118. Alternatively, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 159 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera module 143 as picture/video metadata, and to applications that provide location-based services such as weather widgets, local yellow page widgets, and map/navigation widgets).

Applications 136 may include the following modules (or sets of instructions), or a subset or superset thereof:
   contacts module 137 (sometimes called an address book or contact list);
   telephone module 138;
   video conferencing module 139;
   e-mail client module 140;
   instant messaging (IM) module 141;
   workout support module 142;
   camera module 143 for still and/or video images;
   image management module 144;
   browser module 147;
   calendar module 148;
   widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
   widget creator module 150 for making user-created widgets 149-6;
   search module 151;
   video and music player module 152, which may be made up of a video player
   module and a music player module;
   notes module 153;
   map module 154; and/or
   online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 28:
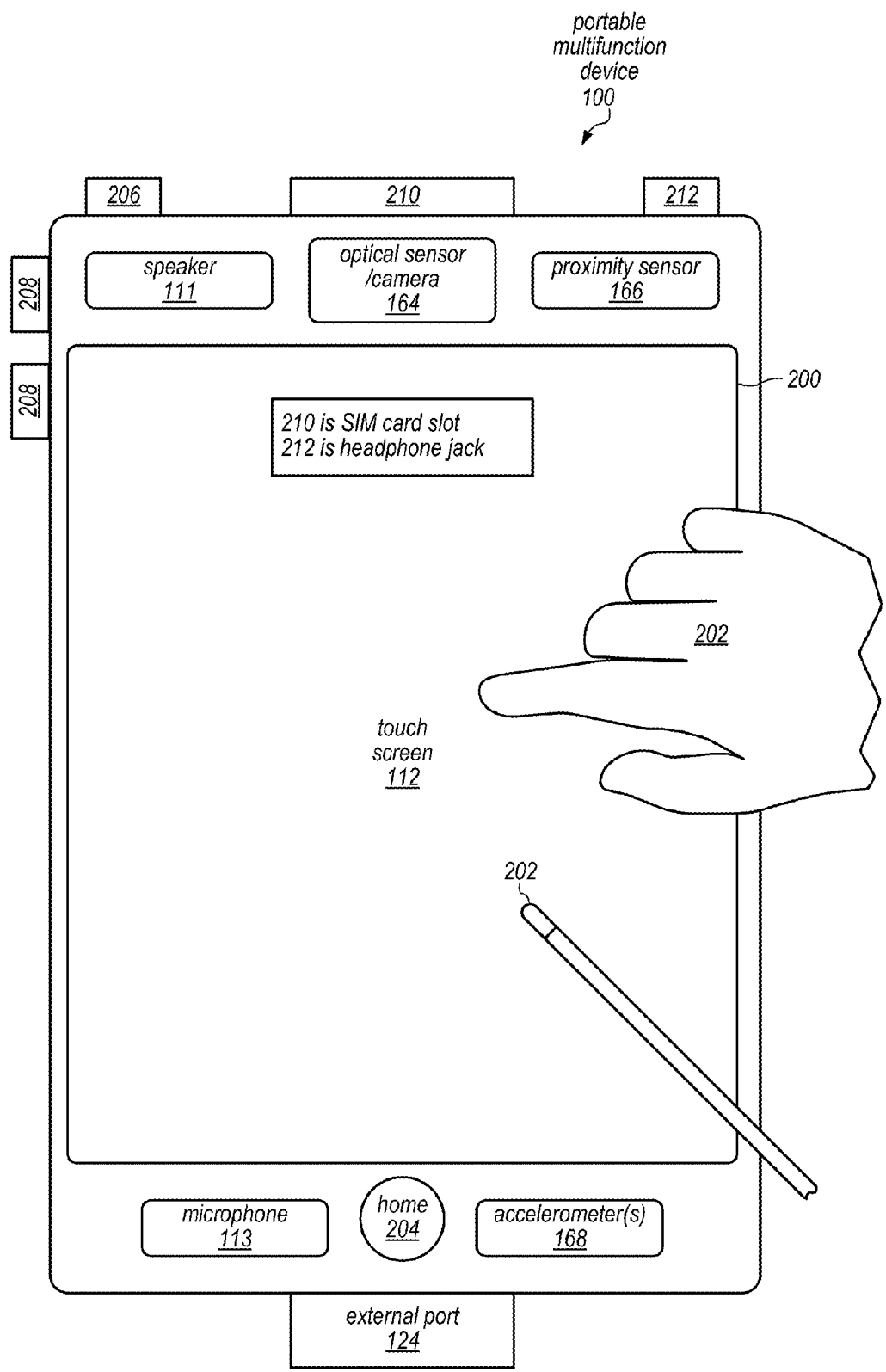
FIG. 28 depicts a portable multifunction device having a camera in accordance with some embodiments.

FIG. 28 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the Figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a graphics user interface (GUI) displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval;

to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the examples herein are given with reference to optical sensor/camera 164 (on the front of a device), a rear-facing camera or optical sensor that is pointed opposite from the display may be used instead of or in addition to an optical sensor/camera 164 on the front of a device. Embodiments of an actuator module 3000 that includes passive damping for optical image stabilization (OIS) may be used in the optical sensor/camera(s) 164

Example Computer System

Figure 29:
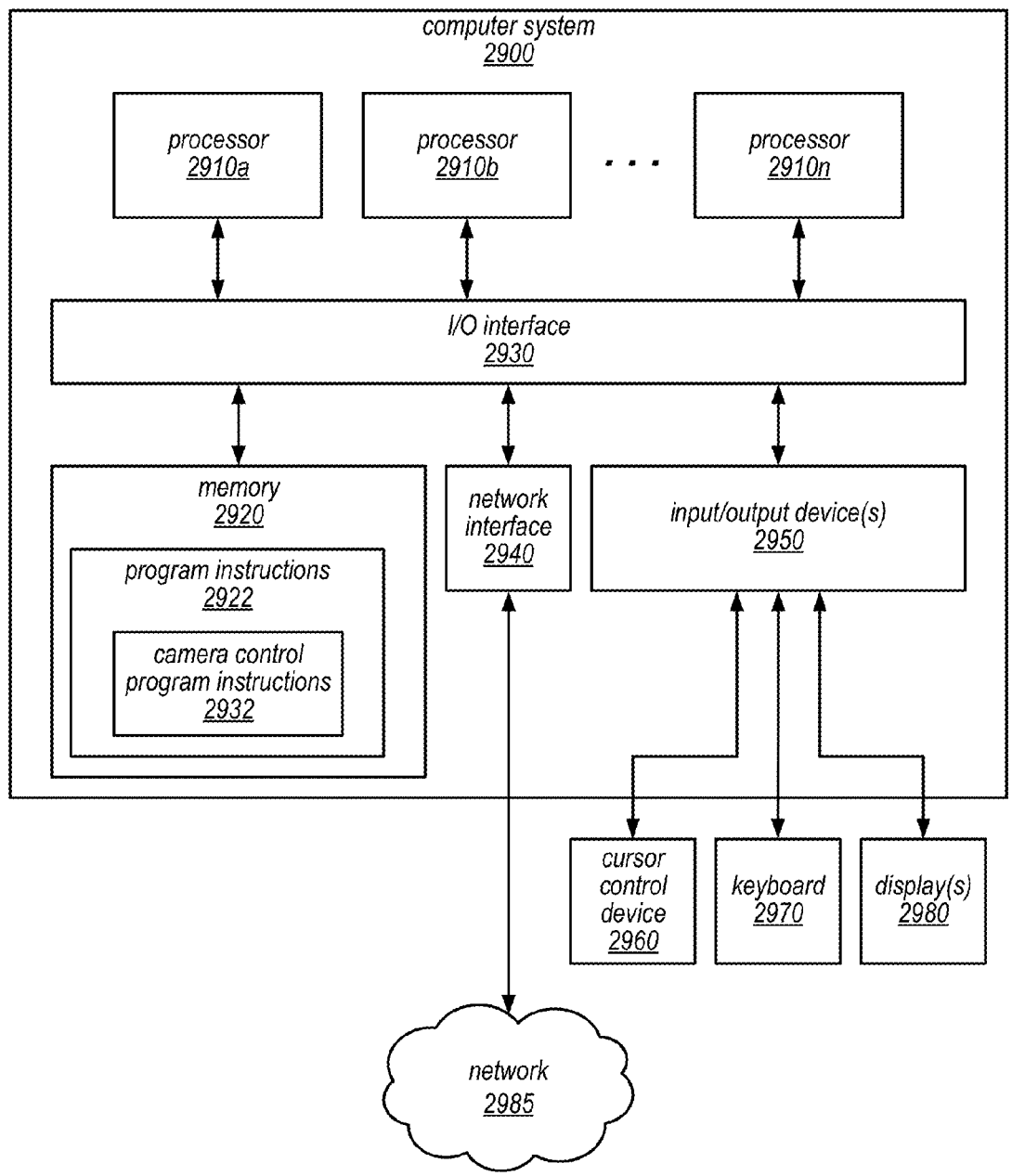
FIG. 29 illustrates an example computer system configured to implement aspects of the system and method for camera control, according to some embodiments.

FIG. 29 illustrates an example computer system 2900 that may be configured to include or execute any or all of the embodiments described above. In different embodiments, computer system 2900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 2900, which may interact with various other devices. Note that any component, action, or functionality described above with respect to FIGS. 1 through 26 may be implemented on one or more computers configured as computer system 2900 of FIG. 29, according to various embodiments. In the illustrated embodiment, computer system 2900 includes one or more processors 2910 coupled to a system memory 2920 via an input/output (I/O) interface 2930. Computer system 2900 further includes a network interface 2940 coupled to I/O interface 2930, and one or more input/output devices 2950, such as cursor control device 2960, keyboard 2970, and display(s) 2980. In some cases, it is contemplated that embodiments may be implemented using a single instance of computer system 2900, while in other embodiments multiple such systems, or multiple nodes making up computer system 2900, may be configured to host different portions or instances of embodiments. For example, in one embodiment some elements may be implemented via one or more nodes of computer system 2900 that are distinct from those nodes implementing other elements.

In various embodiments, computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be general-purpose or embedded processors implementing any of a variety of instruction set architectures (ISAs), such as the x829, PowerPC, SPARC, or MIPS ISAs, or any other suitable ISA. In multiprocessor systems, each of processors 2910 may commonly, but not necessarily, implement the same ISA.

System memory 2920 may be configured to store camera control program instructions 2922 and/or camera control data accessible by processor 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions 2922 may be configured to implement a lens control application 2924 incorporating any of the functionality described above. Additionally, existing camera control data 2932 of memory 2920 may include any of the information or data structures described above. In some embodiments, program instructions and/or data may be received, sent or stored upon different types of computer-accessible media or on similar media separate from system memory 2920 or computer system 2900. While computer system 2900 is described as implementing the functionality of functional blocks of previous Figures, any of the functionality described herein may be implemented via such a computer system.

In one embodiment, I/O interface 2930 may be configured to coordinate I/O traffic between processor 2910, system memory 2920, and any peripheral devices in the device, including network interface 2940 or other peripheral interfaces, such as input/output devices 2950. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network 2985 (e.g., carrier or agent devices) or between nodes of computer system 2900. Network 2985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2950 may, in some embodiments, include one or more display terminals, keyboards, keypads, touchpads, scanning devices, voice or optical recognition devices, or any other devices suitable for entering or accessing data by one or more computer systems 2900. Multiple input/output devices 2950 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2940.

As shown in FIG. 29, memory 2920 may include program instructions 2922, which may be processor-executable to implement any element or action described above. In one embodiment, the program instructions may implement the methods described above. In other embodiments, different elements and data may be included. Note that data may include any data or information described above.

Those skilled in the art will appreciate that computer system 2900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   an optics assembly comprising an optics component, wherein the optics assembly is configured to move within the apparatus on one or more axes orthogonal to an optical axis of the optics component;
   a fixed component comprising a base on which the optics assembly is disposed and a shield can that substantially covers the optics assembly; and
   one or more passive dampers disposed in a space between an upper surface of the optics assembly that is substantially orthogonal to the optical axis and an inner surface of the shield can, wherein the passive dampers contact the upper surface of the optics assembly and the inner surface of the shield can, and wherein the passive dampers disposed in the space between and in contact with the upper surface of the optics assembly and the inner surface of the shield can are configured to passively dampen motions of the optics assembly within the apparatus.

2. The apparatus as recited in claim 1, wherein the apparatus includes an optical image stabilization (OIS) mechanism configured to move the optics assembly within the apparatus on one or more axes orthogonal to an optical axis of the optics component in response to external excitation or disturbance to stabilize an image plane formed by the optics component at an image sensor.

3. The apparatus as recited in claim 2, wherein the OIS mechanism is a voice coil motor (VCM) technology actuator.

4. The apparatus as recited in claim 2, wherein the passive dampers are configured to passively dampen movements of the optics assembly by the OIS mechanism.

5. The apparatus as recited in claim 1, wherein the apparatus includes a focusing mechanism configured to move the optics component within the optics assembly along the optical axis to provide focusing of an image plane formed by the optics component at an image sensor.

6. The apparatus as recited in claim 1, wherein the passive dampers are configured to dampen movements of the optics assembly on an XY plane orthogonal to an optical (Z) axis of the optics component.

7. The apparatus as recited in claim 1, wherein the passive dampers are configured to dampen movements of the optics assembly on an optical (Z) axis of the optics component or to reduce impact shock of the optics assembly within the apparatus during optical (Z) axis displacement.

8. The apparatus as recited in claim 1, wherein the optics assembly is suspended by a plurality of wires on the base of the apparatus, each wire substantially parallel to the optical axis of the optics component, wherein the shield can is coupled to the base.

9. The apparatus as recited in claim 1, wherein the upper surface of the optics assembly includes a pocket or cavity at each passive damper location that is configured to contain material of the passive damper during optical (Z) axis displacement.

10. The apparatus as recited in claim 1, wherein each passive damper is composed of a viscoelastic material that contacts the upper surface of the optics assembly and the inner surface of the shield can to provide passive damping to motions of the optics assembly within the apparatus.

11. The apparatus as recited in claim 10, wherein the viscoelastic material is a silicon gel.

12. The apparatus as recited in claim 1, wherein the optics assembly further comprises an actuator component, wherein the actuator component is coupled to the optics component by one or more springs that provide optical (Z) axis movement to the optics component relative to the actuator component, and wherein the passive dampers are disposed between a top surface of the actuator component and the inner surface of the shield can.

13. A method, comprising:
assembling a base assembly for an optical image stabilization (OIS) voice coil motor (VCM) actuator module;
assembling an optics assembly for the OIS VCM actuator module;
applying a passive damping material at one or more locations on a top surface of the optics assembly substantially orthogonal to an optical axis of the optical assembly; and
mounting a shield can to the base assembly over the optics assembly, wherein said mounting leaves a space between the top surface of the optics assembly and an inner surface of the shield can and permits movement of the optical assembly relative to the shield can, wherein the passive damping material at the one or more locations on the top surface of the optics assembly contacts corresponding locations on the inner surface of the shield can;
wherein the passive damping material disposed in the space between and in contact with the top surface of the optics assembly and the inner surface of the shield can is configured to apply passive damping to motions of the optics assembly within the OIS VCM actuator module.

14. The method as recited in claim 13, further comprising suspending the optics assembly on the base assembly using two or more suspension wires.

15. The method as recited in claim 13, wherein said applying a passive damping material at one or more locations on a top surface of the optics assembly comprises:
dispensing the passive damping material at the one or more locations on the top surface of the optics assembly;
performing a vertical automated optical inspection (AOI) to determine if the passive damping material is properly positioned at the locations on the top surface of the optics assembly and to determine that the extent of the material that was dispensed at the locations is within minimum and maximum boundaries;
curing the passive damping material that was deposited at the one or more locations on the top surface of the optics assembly; and
performing an automated optical inspection (AOI) profile scan to determine if the cured passive damping material at the one or more locations is within a height H tolerance and within a diameter D tolerance.

16. The method as recited in claim 15, wherein the passive damping material is a silicon gel, and wherein said curing the passive damping material is performed by application of ultraviolet (UV) light to the silicon gel.

17. The method as recited in claim 13, wherein the optics assembly comprises an actuator magnet component and an optics component, wherein the actuator magnet component is coupled to the optics component by one or more springs that provide optical (Z) axis movement to the optics component relative to the actuator magnet component, and wherein the passive damping material is applied at locations on a top surface of the actuator magnet component.

18. A camera, comprising:
a photosensor configured to capture light projected onto a surface of the photosensor; and
an actuator module comprising:
an optics assembly configured to refract light from an object field located in front of the camera onto the photosensor;
a base on which the optics assembly is disposed and a shield can that substantially covers the optics assembly;
an optical image stabilization (OIS) mechanism configured to move the optics assembly within the actuator module and relative to the shield can on one or more axes orthogonal to an optical axis of the camera to stabilize an image plane formed by the optics assembly at the photosensor; and
one or more passive dampers disposed in a space between an upper surface of the optics assembly and an inner surface of the shield can, wherein the upper surface is substantially orthogonal to the optical axis, wherein the passive dampers contact the upper surface of the optics assembly and the inner surface of the shield can, and wherein the passive dampers disposed in the space between and in contact with the upper surface of the optics assembly and the inner surface of the shield can are configured to passively dampen movements of the optics assembly by the OIS mechanism.

19. The camera as recited in claim 18, wherein the OIS mechanism is a voice coil motor (VCM) technology actuator.

20. The camera as recited in claim 18, wherein the passive dampers are composed of a viscoelastic material that contacts the upper surface of the optics assembly and the inner surface of the shield can to provide passive damping to motions of the optics assembly within the actuator module on an XY plane orthogonal to the optical axis of the camera.

* * * * *